United States Patent
Tzidon et al.

(10) Patent No.: US 10,720,659 B2
(45) Date of Patent: Jul. 21, 2020

(54) SYSTEMS AND METHODS FOR REGENERATION OF AQUEOUS ALKALINE SOLUTION

(71) Applicants: ARCONIC TECHNOLOGIES LLC, Pittsburgh, PA (US); PHINERGY LTD., Lod (IL)

(72) Inventors: Aviv Tzidon, Tel Aviv (IL); Mark Weaver, Greenwell Springs, LA (US); Ilya Yakupov, Rehovot (IL); Dekel Tzidon, Hod Hasharon (IL); Avraham Yadgar, Kiryat Ono (IL); Nicola Menegazzo, Pittsburgh, PA (US)

(73) Assignee: PHINERGY LTD, Lod (IL)

( * ) Notice: Subject to any disclaimer, the term of this patent is extended or adjusted under 35 U.S.C. 154(b) by 625 days.

(21) Appl. No.: 15/303,085

(22) PCT Filed: Apr. 13, 2015

(86) PCT No.: PCT/IL2015/050399
§ 371 (c)(1),
(2) Date: Oct. 10, 2016

(87) PCT Pub. No.: WO2015/159288
PCT Pub. Date: Oct. 22, 2015

(65) Prior Publication Data
US 2017/0033382 A1    Feb. 2, 2017

Related U.S. Application Data

(60) Provisional application No. 61/978,914, filed on Apr. 13, 2014.

(51) Int. Cl.
| | |
|---|---|
| *H01M 8/00* | (2016.01) |
| *H01M 8/06* | (2016.01) |
| *H01M 8/083* | (2016.01) |
| *H01M 12/08* | (2006.01) |
| *H01M 6/52* | (2006.01) |
| *C01F 7/14* | (2006.01) |
| *C22B 21/00* | (2006.01) |
| *H01M 10/54* | (2006.01) |
| *B60L 3/00* | (2019.01) |
| *C01F 7/02* | (2006.01) |
| *C01F 7/00* | (2006.01) |
| *C01F 7/04* | (2006.01) |
| *B60L 58/16* | (2019.01) |
| *B60L 50/64* | (2019.01) |
| *H01M 12/06* | (2006.01) |

(52) U.S. Cl.
CPC ......... *H01M 8/0693* (2013.01); *B60L 3/0046* (2013.01); *B60L 50/64* (2019.02); *B60L 58/16* (2019.02); *C01F 7/002* (2013.01); *C01F 7/005* (2013.01); *C01F 7/02* (2013.01); *C01F 7/04* (2013.01); *C01F 7/14* (2013.01); *C22B 21/0023* (2013.01); *H01M 6/52* (2013.01); *H01M 8/083* (2013.01); *H01M 10/54* (2013.01); *H01M 12/08* (2013.01); *C01P 2002/22* (2013.01); *H01M 12/06* (2013.01); *H01M 2300/0014* (2013.01); *Y02E 60/128* (2013.01); *Y02P 10/234* (2015.11); *Y02P 70/56* (2015.11); *Y02T 10/7005* (2013.01); *Y02T 10/705* (2013.01); *Y02W 30/84* (2015.05)

(58) Field of Classification Search
CPC ...... H01M 6/52; H01M 10/54; H01M 8/0693; H01M 8/083; H01M 12/08; B60L 58/16; B60L 3/0046; B60L 50/64; C22B 21/0023; C01F 7/002; C01F 7/005; C01F 7/02; C01F 7/04; C01F 7/14
See application file for complete search history.

(56) References Cited

U.S. PATENT DOCUMENTS

| | | | |
|---|---|---|---|
| 3,511,606 A * | 5/1970 | Halff | C01D 1/34 423/127 |
| 3,539,306 A | 11/1970 | Kumura et al. | |
| 3,653,704 A | 4/1972 | Hawkins | |
| 3,796,792 A | 3/1974 | Miyata et al. | |
| 3,879,523 A | 4/1975 | Miyata et al. | |
| 3,879,525 A | 4/1975 | Miyata et al. | |
| 3,912,775 A | 10/1975 | Broecker et al. | |
| 4,145,400 A | 3/1979 | Adsetts | |
| 4,277,344 A | 7/1981 | Cadotte | |
| 4,372,805 A | 2/1983 | Takahashi et al. | |

(Continued)

FOREIGN PATENT DOCUMENTS

| | | | |
|---|---|---|---|
| AU | 2013 202 654 | | 4/2014 |
| AU | 2013202654 | * | 4/2014 |

(Continued)

OTHER PUBLICATIONS

Tongamp et al, "Preparation of Meixnerite . . . " J. Mat. Sci. Nov. 2007, vol. 42, Issue 22, pp. 9210-9215. (Year: 2007).*

(Continued)

*Primary Examiner* — Steven J Bos
(74) *Attorney, Agent, or Firm* — Pearl Cohen Zedek Latzer Baratz LLP

(57) ABSTRACT

This invention is directed to regeneration of solutions comprising metal ions, and production of valuable hydroxide compounds. Specifically, the invention is related to regeneration of spent electrolyte solutions comprising metal ions (e.g. Al ions), such as electrolyte solutions used in metal/air batteries. The invention is further related to production of layered double hydroxides, and, optionally aluminum trihydroxide from aluminate.

15 Claims, 12 Drawing Sheets

(56) References Cited

U.S. PATENT DOCUMENTS

| | | |
|---|---|---|
| 4,454,244 A | 6/1984 | Woltermann |
| 4,458,026 A | 7/1984 | Reichle |
| 4,482,542 A | 11/1984 | Schneider et al. |
| 4,491,624 A | 1/1985 | Sarbacher et al. |
| 4,539,195 A | 9/1985 | Schanz et al. |
| 4,774,212 A | 9/1988 | Drezdon |
| 4,883,533 A | 11/1989 | Kosin et al. |
| 4,904,457 A | 2/1990 | Misra |
| 4,908,281 A | 3/1990 | O'Callaghan |
| 4,970,191 A | 11/1990 | Schutz |
| 4,994,332 A | 2/1991 | Coin et al. |
| 5,049,233 A | 9/1991 | Davis |
| 5,075,087 A | 12/1991 | Kosin et al. |
| 5,075,089 A | 12/1991 | Misra et al. |
| 5,114,802 A | 5/1992 | O'Callaghan |
| 5,250,279 A | 10/1993 | Preston et al. |
| 5,348,725 A | 9/1994 | Misra et al. |
| 5,376,471 A | 12/1994 | Hunter et al. |
| 5,384,017 A | 1/1995 | Lumbroso et al. |
| 5,399,329 A | 3/1995 | Schutz et al. |
| 5,437,720 A | 8/1995 | Cox et al. |
| 5,484,512 A | 1/1996 | Sasaki et al. |
| 5,484,583 A | 1/1996 | Grubbs et al. |
| 5,514,361 A | 5/1996 | Martin et al. |
| 5,578,286 A | 11/1996 | Martin et al. |
| 5,595,504 A | 1/1997 | Muller |
| 5,645,810 A | 7/1997 | Easley |
| 5,728,363 A | 3/1998 | Martin et al. |
| 5,750,453 A | 5/1998 | Easley et al. |
| 5,776,424 A | 7/1998 | Martin et al. |
| 5,814,291 A | 9/1998 | Kelkar |
| 5,882,622 A | 3/1999 | Easley et al. |
| 5,952,117 A * | 9/1999 | Colborn ............... H01M 2/40 429/101 |
| 5,955,048 A | 9/1999 | Cedro, III et al. |
| 5,980,771 A | 11/1999 | Cowan |
| 6,028,023 A | 2/2000 | Vierheilig |
| 6,376,405 B1 | 4/2002 | Stamires et al. |
| 6,468,488 B1 | 10/2002 | Stamires et al. |
| 6,514,473 B2 | 2/2003 | Noweck et al. |
| 6,593,265 B2 | 7/2003 | Stamires et al. |
| 6,723,218 B2 * | 4/2004 | Hadley ............... B01D 61/44 204/633 |
| 7,361,264 B2 | 4/2008 | Vierheilig |
| 7,740,828 B2 | 6/2010 | Sanchez-Valente et al. |
| 7,897,136 B2 | 3/2011 | Eisgruber et al. |
| 8,142,938 B2 | 3/2012 | Khasin et al. |
| 8,409,540 B2 | 4/2013 | Kwon et al. |
| 8,623,320 B2 | 1/2014 | Song et al. |
| 2002/0051898 A1 | 5/2002 | Moulthrop et al. |
| 2002/0179456 A1 | 12/2002 | Yamashita et al. |
| 2004/0126631 A1 | 7/2004 | Uchida et al. |
| 2004/0134132 A1 | 7/2004 | Uchida et al. |
| 2005/0129996 A1 | 6/2005 | Moulthrop et al. |
| 2010/0233786 A1 | 9/2010 | O'Connor |
| 2011/0045385 A1 | 2/2011 | Makita |
| 2013/0206606 A1 | 8/2013 | Gilliam et al. |
| 2014/0131217 A1 | 5/2014 | Buschmann |
| 2014/0287329 A1 | 9/2014 | Tsukda et al. |
| 2015/0207150 A1 | 7/2015 | Lang et al. |

FOREIGN PATENT DOCUMENTS

| | | |
|---|---|---|
| CA | 1226081 A1 | 8/1987 |
| CN | 1234913 | 11/1999 |
| CN | 1386908 | 12/2002 |
| CN | 1396302 | 2/2003 |
| CN | 101550555 | 10/2009 |
| CN | 101772468 | 7/2010 |
| EP | 0093435 A1 | 11/1983 |
| EP | 0558900 A2 | 9/1993 |
| EP | 0564664 A1 | 10/1993 |
| EP | 0947021 B1 | 12/2001 |
| JP | S62-108475 | 5/1987 |
| JP | H1-163977 | 3/1999 |
| JP | 2000-030721 B1 | 1/2000 |
| JP | 2001-266961 | 9/2001 |
| JP | 2009 231238 A | 10/2009 |
| JP | 2011-258489 | 12/2011 |
| KR | 20130055635 A | 5/2013 |
| WO | WO 00/56660 | 9/2000 |
| WO | WO 2006/084328 | 8/2006 |
| WO | WO 2009-000050 * | 12/2008 |
| WO | WO 2009-039133 * | 3/2009 |
| WO | WO 2010/105303 | 9/2010 |
| WO | WO 2011/046594 A2 | 4/2011 |
| WO | WO 2012/016606 | 2/2012 |
| ZA | 200 204 013 A | 7/2003 |

OTHER PUBLICATIONS

Abello et al. "Stability, reutilization, and scalability of activated hydrotalcites in aldol condensation" Applied Catalysis A: General vol. 342, Issues 1-2, Jun. 30, 2008, pp. 119-125.

Arizaga et al. "Layered hydroxide salts: synthesis, properties and potential applications" Solid State Ionics. Jun. 30, 2007;178(15):1143-62.

Ay et al. "Boron removal by hydrotalcite-like, carbonate-free Mg—Al—No 3-LDH and a rationale on the mechanism" Microporous and mesoporous materials. Jan. 5, 2007;98(1):1-5.

Bravo-Suárez et al. "Review of the synthesis of layered double hydroxides: a thermodynamic approach" Quimica Nova. Aug. 2004;27(4):601-14.

Camino et al "Effect of hydroxides and hydroxycarbonate structure on fire retardant effectiveness and mechanical properties in ethylene-vinyl acetate copolymer" Polymer Degradation and Stability vol. 74, Issue 3, 2001, pp. 457-464.

Cavani et al. "Hydrotalcite-type anionic clays: Preparation, properties and applications" Catalysis Today vol. 11, Issue 2, Dec. 2, 1991, pp. 173-301.

Chetia et al. "Arsenic removal from water using calcined Mg—Al layered double hydroxide" Clean Technologies and Environmental Policy. Feb. 1, 2012;14(1):21-7.

Costa, Francis Reny "Mg—Al Layered Double Hydroxide: A Potential Nanofiller and Flame-Retardant for Polyethylene",2007.

Ferreira et al. "Evaluation of boron removal from water by hydrotalcite-like compounds" Chemosphere. Jan. 2006;62(1):80-8.

Gillman, G.P. "A simple technology for arsenic removal from drinking water using hydrotalcite" Sci Total Environ. Aug. 1, 2006;366(2-3):926-31.

Goh et al. "Application of layered double hydroxides for removal of oxyanions: a review" Water Res. Mar. 2008;42(6-7):1343-68.

Grover et al. "Synthetic hydrotalcite-type and hydrocalumite-type layered double hydroxides for arsenate uptake" Applied Clay Science. May 31, 2010;48(4):631-7.

Guillot "Aluminum Removal and Sodium Hydroxide Regeneration from Hanford Tank Waste by Lithium Hydrotalcite Precipitation Summary of Prior Lab-Scale Testing" 2011, Washington River Protection Solutions, U.S. Dept. of Energy Contract DE-AC27-08RV14800.

Guo et al. "Fluoride removal from water by meixnerite and its calcination product" Applied Clay Science vol. 56, Feb. 2012, pp. 7-15.

Guo et al. "Removal of fluoride and arsenate from aqueous solution by hydrocalumite via precipitation and anion exchange" Chemical engineering journal. Sep. 30, 2013;231:121-31.

Hanif et al. "A study on high temperature CO2 capture by improved hydrotalcite sorbents" Chemical Engineering Journal vol. 236, Jan. 15, 2014, pp. 91-99.

Hydrotalcite (CAS 12304-65-3) Market Research Report, 2014.

International Search Report for PCT Application No. PCTIL2015050399 dated Aug. 2, 2015.

Kirk-Othmer Encyclopedia of Chemical Technology. Copyright John Wiley & Sons, Inc., vol. 2, p. 274.

Liu et al. "Fabrication and characterization of positively charged hybrid ultrafiltration and nanofiltration membranes via the in-situ exfoliation of Mg/Al hydrotalcite" Desalination vol. 335, Issue 1, Feb. 17, 2014, pp. 78-86.

(56) References Cited

OTHER PUBLICATIONS

Long et al. "Facile synthesis of hydrotalcite and its thermal decomposition kinetics mechanism study with masterplots method" Thermochimica Acta vol. 579, Mar. 10, 2014, pp. 50-55.

Lukashin et al. "Influence of The Preparation Conditions on the Structure of Hydrotalcite Layered Double Hydroxides" MRS Proceedings, vol. 547 Jan. 1998, 239.

Martens et al. "Geochemical modeling of leaching of Ca, Mg, Al, and Pb from cementitious waste forms" Cement and Concrete Research. Aug. 31, 2010;40(8):1298-305.

Matusinovic et al. "The role of dispersion of LDH in fire retardancy: The effect of dispersion on fire retardant properties of polystyrene/Ca—Al layered double hydroxide nanocomposites" Polymer Degradation and Stability vol. 97, Issue 9, Sep. 2012, pp. 1563-1568.

Mironycheva et al. "The Regularities of Synthesis of Gidroksoalyinat Magnesium" Ulyanovsk State University, Ulyanovsk, Russia.

Miyata, S. "Anion-exchange properties of hydrotalcite-like compounds" Clays Clay Miner. Jan. 1, 1983;31(4):305-11.

Mokhtar et al. "Thermal decomposition, gas phase hydration and liquid phase reconstruction in the system Mg/Al hydrotalcite/mixed oxide: A comparative study" Applied Clay Science vol. 50, Issue 2, Oct. 2010, pp. 176-181.

Noh et al. "Synthesis and Characterization of Silver (Core)/Layered Double Hydroxides (Shell) Nanoparticles" International Journal of Material Science vol. 2, Issue 3, 2012, pp. 83-87.

Paikaray et al. "Controls on arsenate, molybdate, and selenate uptake by hydrotalcite-like layered double hydroxides" Chemical Geology. May 8, 2013;345:130-8.

Palmer et al. "Hydrotalcites and their role in coordination of anions in Bayer liquors: Anion binding in layered double hydroxides" Coordination Chemistry Reviews vol. 253, Issues 1-2, Jan. 2009, pp. 250-267.

Palmer et al. "Determination of the mechanism(s) for the inclusion of arsenate, vanadate, or molybdate anions into hydrotalcites with variable cationic ratio" J Colloid Interface Sci. Jan. 15, 2009;329(2):404-9.

Qiao et al. "Aerobic oxidation of benzyl alcohol over Co 3 O 4/rehydrated hydrotalcite catalysts: The promotional effect of hydrotalcite support" Catalysis Communications. Feb. 5, 2014;45:44-8; Abstract.

Reyero et al. "Structured catalysts based on Mg—Al hydrotalcite for the synthesis of biodiesel" Catalysis Today vol. 216, Nov. 1, 2013, pp. 211-219.

Salomao et al "Hydrotalcite synthesis via co-precipitation reactions using MgO and Al(OH)3 precursors" Ceramics International vol. 37, Issue 8, Dec. 2011, pp. 3063-3070.

Tao et al. "Synthesis and characterization of layered double hydroxides with a high aspect ratio" Journal of Solid State Chemistry. Mar. 31, 2006;179(3):708-15.

Thao et al. "Selective oxidation of styrene over Mg—Co—Al hydrotalcite like-catalysts using air as oxidant" Catalysis Communications. Feb. 5, 2014;45:153-7.

Theiss et al. "Removal of boron species by layered double hydroxides: a review" J Colloid Interface Sci. Jul. 15, 2013;402:114-21.

Theiss, Frederick L. "Synthesis and Characterisation of Layered Double Hydroxides and their Application for Water Purification" Diss. Queensland University of Technology, 2012.

Tichit et al. "Aldol condensation of acetone over layered double hydroxides of the meixnerite type" Applied Clay Science vol. 13, Issues 5-6, Nov. 1998, pp. 401-415.

Tongamp et al. "Preparation of meixnerite (Mg—Al—OH) type layered double hydroxide by a mechanochemical route" Journal of Materials Science Nov. 2007, vol. 42, Issue 22, pp. 9210-9215.

Tsujimura et al. "Synthesis and sulfate ion-exchange properties of a hydrotalcite-like compound intercalated by chloride ions" J Hazard Mater. May 8, 2007;143(1-2):582-6.

Urena-Amate et al. "Controlled release of nitrate from hydrotalcite modified formulations" Applied Clay Science vol. 52, Issue 4, Jun. 2011, pp. 368-373.

Viswanathan et al. "Selective fluoride adsorption by a hydrotalcite/chitosan composite" Applied Clay Science. May 31, 2010;48(4):607-11.

Wang et al. "Preparation of Aluminum Hydroxide with Dissolution of Sodium Aluminate in Methanol-Water Solvent", 2008, The Chinese Journal of Process Engineering 8.1 p. 72; Abstract.

Wang et al. "Hydrotalcite-like compounds containing transition metals as solid base catalysts for transesterification" Chemical engineering journal. Nov. 15, 2011;175:548-54.

Xu et al. "Ion exchange membranes: State of their development and perspective", Journal of Membrane Science 263 (2005) 1-29.

Yadav et al. "A green process for glycerol valorization to glycerol carbonate over heterogeneous hydrotalcite catalyst" Catalysis Today vol. 237, Nov. 15, 2014, pp. 47-53.

Yong-Zhong et al. "Thermal stability, smoke emission and mechanical properties of poly (vinyl chloride)/hydrotalcite nanocomposites" Polymer Degradation and Stability. Feb. 1, 2008;93(2):448-55.

Yun et al. "Synthesis and catalytic properties of silicate-intercalated layered double hydroxides formed by intragallery hydrolysis of tetraethylorthosilicate" Clays and clay minerals. Aug. 1, 1995;43(4):503-10.

Zhang et al. "Synthesis of a hydrotalcite-like compound from oil shale ash and its application in uranium removal" Colloids and Surfaces A: Physicochemical and Engineering Aspects vol. 444, Mar. 5, 2014, pp. 129-137.

Zhao et al. "Preparation of Layered Double-Hydroxide Nanomaterials with a Uniform Crystallite Size Using a New Method Involving Separate Nucleation and Aging Steps" Chem. Mater., 2002, 14 (10), pp. 4286-4291.

European Search Report of Application No. EP 15 77 9173 dated Mar. 7, 2017.

Fitzpatrick et al. "Aluminium is a fuel for tomorrow" New Scientist. Jul. 17, 1986;111(1517).

Vrbaški et al. "The spontaneous precipitation of hydrated alumina from aluminate solutions" Canadian Journal of Chemistry. Oct. 1, 1958;36(10):1410-5.

Zaromb et al. "Feasibility of electrolyte regeneration in Al batteries" Journal of The Electrochemical Society. Dec. 1, 1962;109(12):1191-2.

Wang et al., Kinetics of Boehmite Precipitations from Supersaturated Sodium Aluminate Solutions with Ethanol-Water Solvent, Light Metals, The Minerals, Metals & Materials Society, pertinent pp. 119-120 provided, 2012.

\* cited by examiner

Flowpath 1

Flowpath 2

Flowpath 6

SYSTEMS AND METHODS FOR REGENERATION OF AQUEOUS ALKALINE SOLUTION

CROSS-REFERENCE TO RELATED APPLICATIONS

This application is a National Phase Application of PCT International Application No. PCT/IL2015/050399, International Filing Date Apr. 13, 2015, claiming priority of U.S. Provisional Patent Application No. 61/978,914, filed Apr. 13, 2014 which are hereby incorporated by reference.

FIELD OF THE INVENTION

This invention relates to regeneration of solutions comprising metal ions. Specifically, the invention is related to regeneration alkaline solutions such as spent electrolyte solutions comprising metal ions, such as alkaline electrolyte solutions used in metal/air batteries or in hydrogen generators.

BACKGROUND OF THE INVENTION

Metal-air electrochemical power sources, particularly Al-air batteries and fuel cells with alkaline electrolyte are suitable for electric vehicles, unmanned aerial vehicles (UAV), reserve and emergency power supply and other applications.

Metal-air system with alkaline electrolyte has a great electrochemical capacity (about 8 k Wh/kg). However, during the operation of metal-Air batteries, products of the dissolution of metal anodes are accumulated in the electrolyte thus lowering the efficiency of the metal-air battery. Accordingly, following a certain operation time, the electrolyte solution needs to be replaced or regenerated.

One of the ways to regenerate the electrolyte is inducing the precipitation of the products of aluminum anode dissolution in the form of solid aluminum tri-hydroxide (ATH), and removing of ATH by filtration. However, the complete regeneration of alkaline solution by this method is not always possible. Accordingly, there is a need for method to remove the products of aluminum dissolution from alkaline electrolyte solutions, as complete as possible, and, preferably in a form of valuable byproducts.

Besides the above mentioned ATH, one group of desired byproducts that dissolved aluminum may be converted to is layered metal hydroxides (LMHs). LMHs consisting of positively charged metal hydroxide nano-layers and interlayer anions and water molecules in the interlayer. Layered metal hydroxides are used in the industry for ion-exchangers, catalyst, anti-acid, magnetic material, controlled release formulation, pharmaceutical products and polymer reinforcement materials, and transparent electrode and optoelectronic devices.

LMHs can be classified into three categories according to the structure and metal-ligand coordination type. One is layered double hydroxide (LDH) which can be represented by a general formula of $[M^{2+}_{1-x}M^{3+}x(OH)_2]^{x+}(A^{n-})_{x/n} \cdot mH_2O$ ($M^{2+}$: divalent metal, $M^{3+}$: trivalent metal, A: interlayer guest anion, $0<x<1$, m and n are integers). Exemplified LDH is the naturally occurring mineral hydrotalcite (HTC) which is also referred to as magnesium aluminum hydroxy carbonate hydrate and is generally represented by the chemical formula: $Mg_6Al_2(OH)_{16}CO_3 \cdot 4H_2O$. HTC has found industrial usage in the following application areas.

Pharmaceuticals (antacid)
Polymer additive (acid scavenger, fire retardant)
Catalyst or catalyst support
Adsorbent
Ion exchange material Along with HTC described above, other LDH compounds exist and have been described in the technical literature. The defining characteristic of these materials is a layered structure where sheets of mixed metal hydroxides are separated by an interlayer gap region that contains water molecules and a negatively charged compound (anion) such as carbonate ($CO_3^{-2}$). A representation of this structure is shown in FIG. 12.

The negatively charged anions in the interlayer gap act as charge balancing sites to compensate for the positive charge induced by the presence of e.g. $Al^{+3}$ atoms in a structure originally containing only $Mg^{+2}$ atoms. Carbonate is the anion that occurs in the natural form of the HTC mineral. However, synthetic HTC can be prepared with any negative ion in the interlayer ($OH^{1-}$, $Cl^{1-}$, $NO_3^{1-}$, $SO_4^{2-}$, $PO_4^{3-}$ etc.). It is also possible to replace the primary cations (Mg and Al) with other metal ions of equal +2 or +3 charge such as Ca, Zn, Fe, Ni, La ions etc.

Another property of the LDH materials is that the interlayer anion can be replaced with an alternative anion via a process known as anion exchange. This allows a target anion such as arsenate ($AsO_4^{-3}$) or chromate ($CrO_4^{-2}$) to be incorporated into the HTC structure via exchange or absorption from an aqueous medium. This property formed the basis for the Alcoa Industrial Chemicals water treatment absorbent product Sorbplus®. All of the current industrial applications of HTC and LDH family compounds are based on synthetically produced material.

SUMMARY OF THE INVENTION

In one embodiment, this invention provides a system for the treatment of aqueous alkaline waste solution comprising dissolved hydroxide ions of metal A, said system comprises:
  at least one reservoir;
  solid-liquid separation means;
  concentration means;
  agitation means;
  inlet for solid and liquid reagent addition;
wherein said system consumes said aqueous alkaline waste solution; and wherein said system produces a regenerated aqueous alkaline solution, comprising reduced amount of dissolved hydroxide ions of metal A or wherein said system produces a regenerated aqueous alkaline solution free of dissolved hydroxide ions of metal A.

In one embodiment, this invention provides a system for the treatment of aqueous alkaline waste solution comprising hydroxide ions of metal A, the system comprises:
  at least one reservoir;
  solid-liquid separation means;
  concentration means;
  agitation means;
  inlet for solid and liquid reagent addition;
wherein the system consumes, as a raw material, aluminate-rich aqueous alkaline waste solution; and wherein the system produces a regenerated aqueous alkaline solution, comprising reduced amount of dissolved aluminates or free of dissolved aluminate.

In one embodiment, this invention provides a method for the treatment of aqueous alkaline waste solution comprising dissolved hydroxide ions of metal A, said method comprising:

providing a system comprising:
  at least one reservoir;
  solid-liquid separation means;
  concentration means;
  agitation means;
  inlet for solid and liquid reagent addition;
introducing, aqueous alkaline waste solution comprising dissolved hydroxide ions of metal A into said system;
producing and separating solid metal A hydroxides, LDH or a combination thereof from said waste solution and reducing the amount of dissolved hydroxide ions of metal A in said waste solution, thus producing a regenerated aqueous alkaline solution, comprising reduced amount of dissolved hydroxide ions of metal A or free of dissolved hydroxide ions of metal A.

In one embodiment, this invention provides a method for the treatment of aqueous alkaline waste solution comprising aluminates, the method comprising:
providing a system comprising:
  at least one reservoir;
  solid-liquid separation means;
  concentration means;
  agitation means;
  inlet for solid and liquid reagent addition;
introducing, aqueous alkaline waste solution comprising aluminates into the system;
producing and separating ATH, LDH or a combination thereof from the waste solution and reducing the amount of aluminates in the waste solution, thus producing a regenerated aqueous alkaline solution, comprising reduced amount of dissolved aluminates or free of dissolved aluminate.

In one embodiment, this invention provides a method for the treatment of aqueous alkaline waste solution comprising dissolved hydroxide ions of metal A and metal B ions, said method comprising precipitating LDH from said aqueous alkaline waste solution.

In one embodiment, this invention provides a method for the treatment of aqueous alkaline waste solution comprising aluminates and metal B ions, the method comprising precipitating LDH from the aqueous alkaline waste solution.

In one embodiment, this invention provides a system for production of energy, the system comprises an energy production unit and a system for the treatment of aqueous alkaline waste solution comprising hydroxide ions of metal A, wherein the energy production unit comprises a cathode, an anode and an electrolyte solution, wherein the anode comprising a metal or a metal alloy and wherein the alloy comprises metals A and B.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
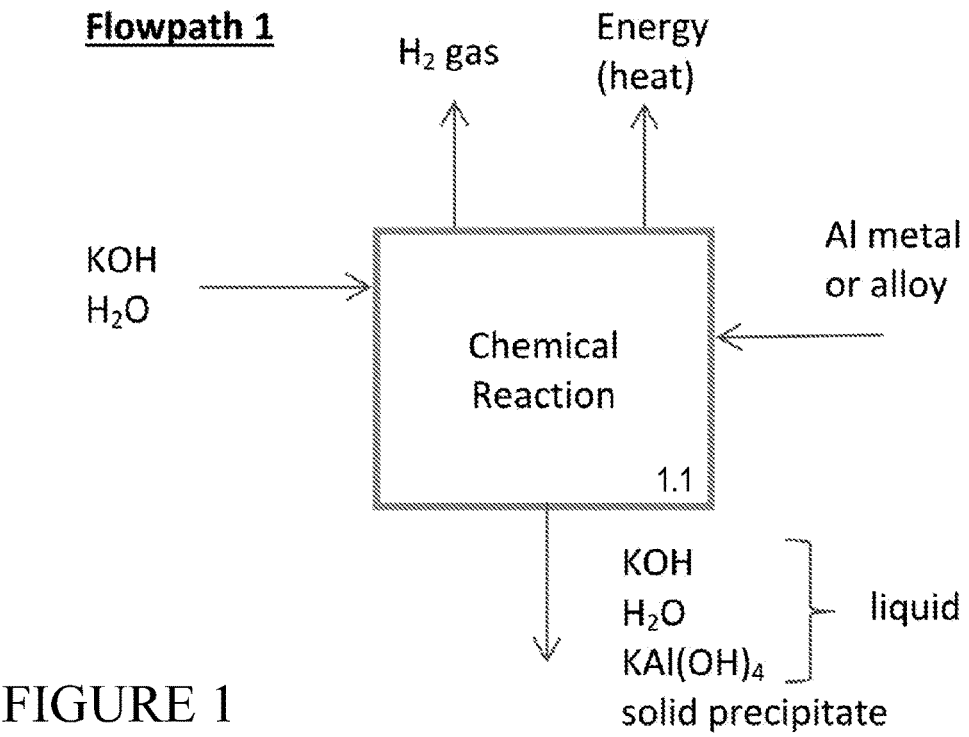
FIG. 1 is a flow chart showing the chemical reaction of Al or Al alloy with alkaline solution. The "solid precipitate" refers to aluminum tri-hydroxide (ATH).

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

Description of the Process

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In one embodiment, this invention provides a method and a system that allows to completely regenerate alkaline solution after it's utilization in an energy production process (spent electrolyte) or in a chemical process, wherein the regenerated electrolyte solution is free of products of utilization (such as aluminates), and wherein the utilization products are separated in the form of valuable pure chemicals (LDH and ATH).

One aspect of this invention is that according to the proposed method, a complete regeneration of the spent electrolyte is achieved. Complete regeneration means that the regenerated electrolyte has free alkali concentration restored to the same level as it was prior to utilization in the battery or hydrogen generator (or in a chemical process), and the utilization products (such as aluminates) are completely removed from the regenerated solution (in contrast to other methods of alkaline solution regeneration, such as, e.g. the regeneration of the liquor of the Bayer process). The complete regeneration, according to one aspect of this invention, is possible due to the utilization of irreversible chemical reaction between the utilization products (such as aluminates) with metal oxide, which results in LDH formation and releases free alkali. This method step appears in the disclosed figures and is described in detail herein below.

In one embodiment, if it is desired to separate part of the utilization product (such as aluminate) in the form of hydroxide (such as ATH), then hydrolysis, or co-solvent assisted hydrolysis may be applied prior to LDH formation step. It allows to reduce the amount of metal oxide needed for LDH formation, and to obtain LDH and ATH by-products in the desired ratio between them.

In one embodiment, the present invention provides a process for the production of LDH from an alkaline solution comprising alkali and non-alkali metal ions. In one embodiment, the present invention provides a process for the production of LDH from materials formed in an electrolyte solution of a metal-air battery. In one embodiment, the present invention provides a process of regeneration of electrolyte solution for subsequent use, the process comprises the formation of LDH from used electrolyte and the separation of LDH from the electrolyte. Once the LDH is separated from the electrolyte, the electrolyte can be re-used in the same or another metal air battery. According to this aspect and in one embodiment, formation of LDH that comprises metal ions originating from the metal in the anode and separation of it from the electrolyte solution reduces the amount of metal ions present in the used electrolyte. The separation of such metal ions from the electrolyte results in an electrolyte solution that has low concentration of metal-ion (that had precipitated) and therefore can be re-used as the electrolyte in the battery. "Metal ions" that had precipitated refers to the non-alkali metal ions previously present in the solution, e.g. Al ions.

One advantage of processes of the present invention is that the LDH formed, can be used for one of the numerous LDH applications as described herein above. Concurrently, the electrolyte can be re-used, since the amount of hydroxide contaminants in it is now reduced (separated from it in the form of LDH), and the desired alkaline compound has been reformed. Thus, operation of metal-air batteries according to processes of the invention is more efficient since the electrolyte is reused. Moreover, it produces valued LDH materials.

In one embodiment, this invention provides a method for production of LDH, said method comprising:
providing a metal A;
dissolving said metal A in an alkaline solution such that said metal A forms metal A ions in said alkaline solution;
optionally precipitating the part of metal A available in the solution as hydroxide;
separating said hydroxide;
adding metal B ions to said alkaline solution to induce precipitation of LDH;
separating said LDH from said alkaline solution; and
optionally drying said LDH.

In one embodiment, this invention provides a method for production of LDH, said method comprising:
providing a metal alloy wherein said alloy comprises metals A and B;
dissolving said metal alloy in an alkaline solution such that metals A and B form metal A ions and metal B ions in said alkaline solution followed by precipitation of LDH;
separating said LDH from said alkaline solution; and
optionally drying said LDH.

In one embodiment, this invention provides a method for production of layered double hydroxides (LDH) from an electrochemical process, said method comprising:
providing an electrochemical cell comprising a cathode, an anode and an electrolyte solution, wherein said anode comprising a metal A;
operating said electrochemical cell, such that metal A forms metal A ions in said electrolyte solution;
optionally transferring said electrolyte solution to a regeneration unit;
optionally precipitating the part of metal A available in the solution as hydroxide;
separating said hydroxide; adding metal B ions to said electrolyte to induce precipitation of LDH;
separating said LDH from said electrolyte solution; and
optionally drying said LDH.

In one embodiment, this invention provides a method for production of layered double hydroxides (LDH) from an electrochemical process, said method comprising:
providing an electrochemical cell comprising a cathode, an anode and an electrolyte solution, wherein said anode comprising a metal alloy and wherein said alloy comprises metals A and B;
operating said electrochemical cell, such that metals A and B form metal A ions and metal B ions in said electrolyte solution followed by LDH precipitation;
optionally transferring said electrolyte solution to a regeneration unit;
separating said LDH from said electrolyte solution; and
optionally drying said LDH.

In one embodiment, this invention is directed to methods and systems for the production of LDH and regeneration of an electrolyte. In another embodiment the LDH comprises Al ions. In another embodiment, the LDH comprises meixnerite, hydrotalcite (HTC), hydrocalumite or a combination thereof.

In one embodiment, the methods or system of this invention make use or comprise an electrochemical cell comprising an anode comprising metal A. In one embodiment, the methods or system of this invention make use or comprise an alkaline solution comprising metal A. In one embodiment, metal A is Al. In one embodiment, metal A is Mg, Li, Sn, Zn.

In one embodiment, the methods and system of this invention make use or comprise an electrochemical cell comprising an anode comprising an alloy of (at least) metal A and a metal B. In one embodiment, the methods and system of this invention make use or comprise an alkaline solution comprising an anode comprising an alloy of metal A and a metal B. In one embodiment the alloy of this invention is Al/Mg alloy, Al/Ga, or Al/Sn. In one embodiment, the alloy comprises Zn, Mg, Li, Ga, Sn or a combination thereof.

In one embodiment, the methods and system of this invention make use or comprise a cathode wherein the cathode is an air cathode. In another embodiment, the cathode comprises silver.

In one embodiment, the methods of this invention comprise dissolving metal A or metal alloy wherein the metal alloy comprises at least metal A and metal B, in an alkaline solution; such that metal A forms metal A ions and metals A and B form metal A ions and metal B ions. In another embodiment, the dissolving step is performed chemically or electrochemically. In one embodiment chemical dissolution of metal A or of metals A and B or of any additional metals present in the metal alloy, generates hydrogen.

In one embodiment, the methods and system of this invention include a step or an inlet of/for adding metal B ions to an electrolyte or to an alkaline solution. In another embodiment, the metal B ion is a metal oxide, metal hydroxide, or a salt. In another embodiment metal B ion which is added include $Mg^{2+}$, $Ga^{2+}$, $Sn^{2+}$, $Ca^{2+}$, $Li^+$, or combination thereof. In another embodiment, the metal B ion which is added is $Mg^{2+}$. In another embodiment, prior to addition of metal B ion a re-digestion step is performed, wherein said re-digestion comprises heating and agitating the solution to re-dissolve aluminum tri-hydroxide precipitate that may have formed in solutions of the invention. In another embodiment, prior to addition of metal B ion, or following the dissolving step, water is added to said alkaline solution, causing precipitation of aluminum tri-hydroxide (ATH). In another embodiment, following the separating step of the LDH, the alkaline solution or the electrolyte undergoes a treatment step comprising: removal of residual aluminate from the alkaline/electrolyte solution by precipitation of aluminum tri-hydroxide. In another embodiment, ATH is precipitated by hydrolysis, electrochemical reaction or by phoresis. In another embodiment, ATH is removed or partially removed from the solution, and thereby the electrolyte can be reused (i.e. regeneration of the electrolyte).

In one embodiment, the methods and system of this invention comprise and make use of an electrolyte or other alkaline solution. In one embodiment the electrolyte or the alkaline solution includes NaOH. In another embodiment the electrolyte or the alkaline solution includes KOH. In another embodiment the electrolyte or the alkaline solution includes $NH_4OH$. In another embodiment the solution concentration of said KOH, NaOH, $NH_4OH$, said organic base hydroxides (e.g. choline base) or a combination thereof is 30%. In one embodiment, the alkaline solution concentration ranges between 10% and 50% weight percent. In one embodiment, the alkaline solution concentration ranges between 20% and 40% weight percent. In one embodiment, the alkaline solution concentration ranges between 25% and 35% weight percent.

In one embodiment, the methods of this invention comprise optionally transferring the used electrolyte solution to regeneration unit. In another embodiment, the regeneration unit is on-board. In another embodiment, the regeneration unit is off-board.

In one embodiment, the methods of this invention comprise a separation step of the LDH. In one embodiment, the separation step includes filtration, centrifugation, washing, solvent evaporation, compression, decanting, or a combination thereof.

In one embodiment, this invention provides a process as described in Example 1. According to this aspect and in one embodiment, metallic Al or an Al alloy is contacted with an alkaline aqueous solution (pH>7), that is substantially free of dissolved carbonate, and allowed to chemically react. A variety of soluble caustic compounds may be used to provide the alkaline condition of pH>7 including, but not limited to, NaOH, KOH, $NH_4OH$, LiOH, organic base hydroxides (e.g. choline base) or a combination thereof. The reaction produces energy (heat) and chemical products consisting of gas ($H_2$), liquids (dissolved aluminate compounds), and solids (metal oxide/hydroxide compounds) suspended in the aqueous phase. This aqueous phase contains some residual dissolved caustic compound from the original solution. The Al alloy may contain alloying elements beneficial to the operation of Al-Air batteries such as, but not limited to, Mg, Ga, and Sn. A flow chart showing an embodiment of such process is shown in FIG. 1.

Figure 2:
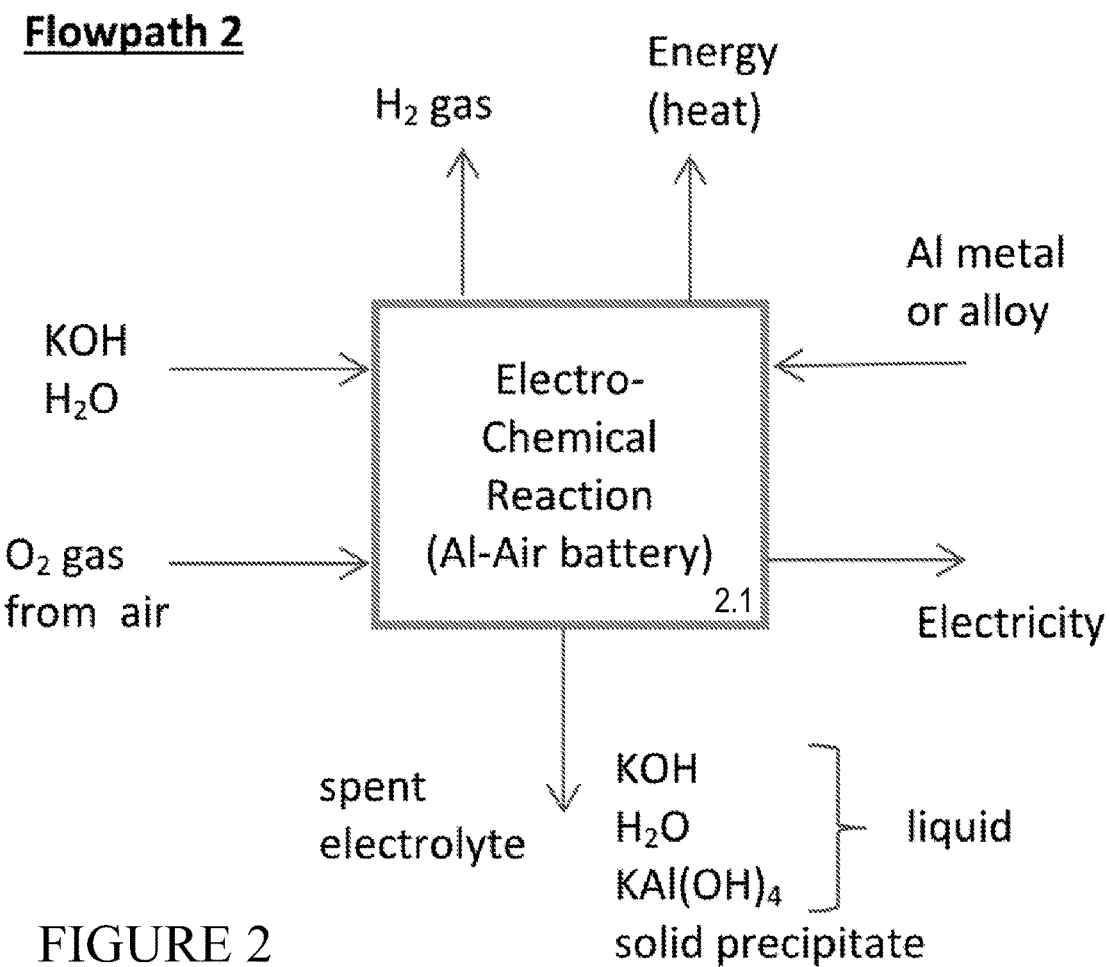
FIG. 2 is a flow chart showing the electro-chemical reaction of Al or Al alloy with alkaline solution. The "solid precipitate" refers to aluminum tri-hydroxide (ATH).

In one embodiment, this invention provides a process as described in Example 2 and in FIG. 2. According to this aspect and in one embodiment, metallic Al or an Al alloy anode is contacted with an alkaline aqueous electrolyte solution (pH>7), that is substantially free of dissolved carbonate in an electrochemical cell. A variety of soluble caustic compounds may be used to provide the alkaline condition of pH>7 including, but limited to, NaOH, KOH, $NH_4OH$, organic base hydroxides (choline base). The electrochemical reaction that occurs produces energy (electricity+heat) and chemical products consisting of gas ($H_2$), liquids (dissolved aluminate compounds), and solids (metal oxide/hydroxide compounds) suspended in the aqueous phase. This aqueous phase from the electrochemical cell is also known as spent electrolyte and contains some residual dissolved caustic compound from the original solution. The Al alloy may contain alloying elements beneficial to the operation of Al-Air batteries such as, but not limited to, Mg, Ga, and Sn. A flow chart showing an embodiment of such process is shown in FIG. 2.

In one embodiment, this invention provides a method for regeneration of an electrolyte from a metal-air battery, said method comprising:
  providing used electrolyte solution from a metal-air battery wherein said solution comprises metal A ions;
  adding metal B ions to said used electrolyte to induce LDH precipitation;
  collecting or separating solid LDH from said used electrolyte solution; and
  collecting or separating regenerated electrolyte from said used electrolyte solution, thereby regenerating said electrolyte.

In one embodiment, this invention provides a method for regeneration of an electrolyte from a metal-air battery, said method comprising:
  providing used electrolyte solution from a metal-air battery, wherein said solution comprises LDH;
  collecting or separating solid LDH from said used electrolyte solution; and
  collecting or separating regenerated electrolyte from said used electrolyte solution, thereby regenerating said electrolyte.

In one embodiment, this invention provides methods for regeneration of an electrolyte by separating LDH from an electrolyte solution. In another embodiment, the methods of regeneration of an electrolyte further include a re-digestion step (following the providing step, wherein the re-digestion comprises heating and agitating the electrolyte to re-dissolve aluminum tri-hydroxide precipitate. In another embodiment, the methods of regeneration of an electrolyte further include adding water to the electrolyte solution (prior to the separating step of the LDH) causing precipitation of aluminum tri-hydroxide (ATH). In another embodiment, ATH is removed from said solution.

In one embodiment, the methods for regeneration of an electrolyte by separating and collecting LDH from an electrolyte solution. In another embodiment, following collecting or separating solid LDH, the electrolyte solution undergoes a treatment step comprising: removal of residual aluminate from said electrolyte solution by precipitation of aluminum tri-hydroxide which is further separated/collected.

Figure 3:
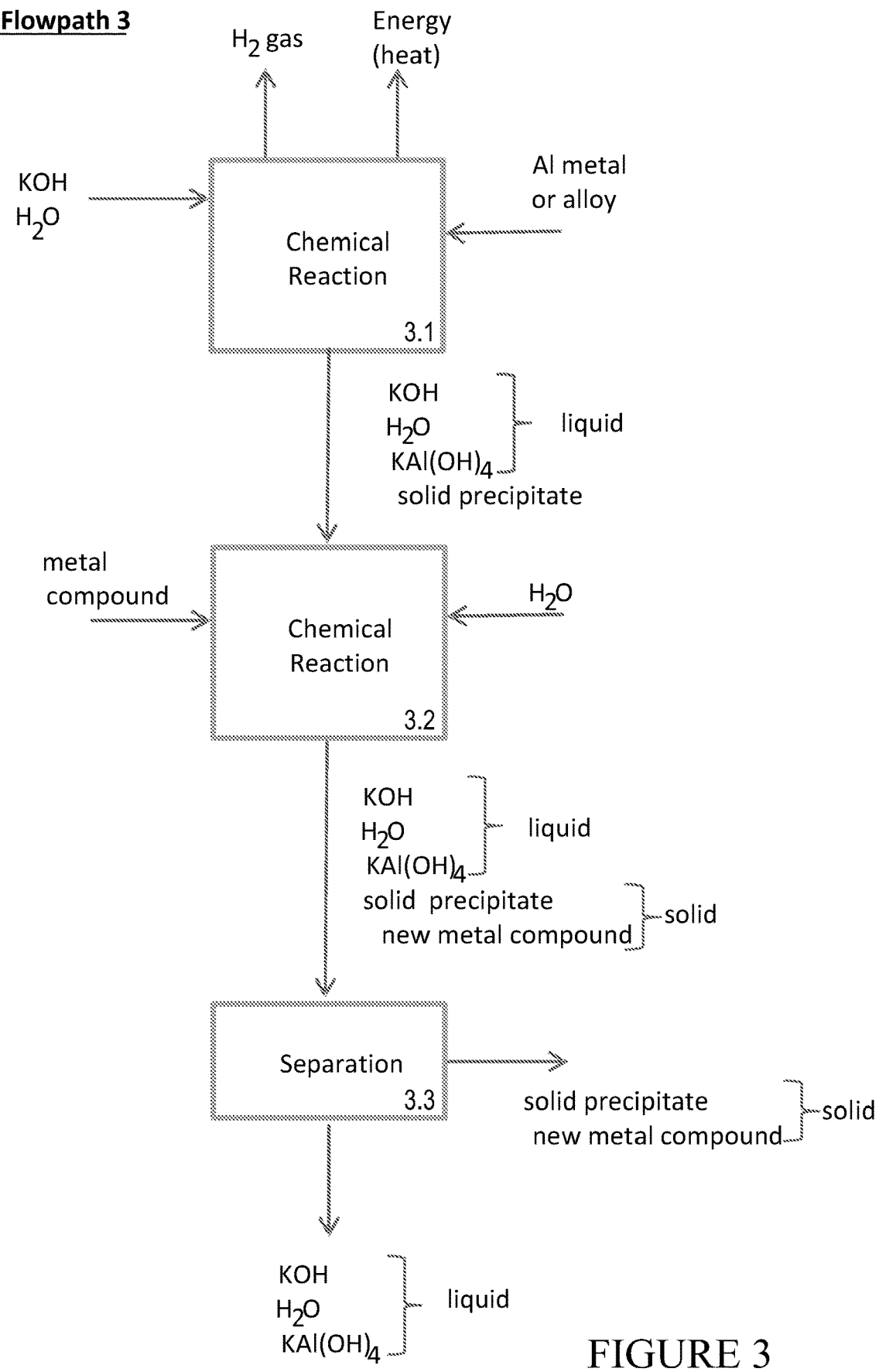
FIG. 3 is a flow chart showing the formation of "new metal compound" from alkaline solutions comprising aluminate. The "metal compound" refers to metal B ions of this invention. The 'solid precipitate" refers to aluminum tri-hydroxide (ATH). The "new metal compound" refers to LDH formation.

In one embodiment, this invention provides a process for the formation of LDH as described in Example 3. According to this aspect and in one embodiment, an aqueous aluminate solution such as the solution formed in Example 1 is treated to chemically convert aluminate compounds into a mixed metal solid suspended in the aqueous solution (e.g. LDH), and to produce a dissolved caustic compound. The mixed metal solid can be separated from the solution. The dissolved caustic compound can be re-used. The conversion/regeneration is accomplished by addition of metal B ions (oxide, hydroxide, salt of metal B ions) to the aqueous aluminate solution. The metal B ions can be added as solid powder, as an aqueous solution of dissolved metal salt or a mixture thereof. The reaction between the dissolved aluminate and the added metal B ions produces a caustic compound that remains dissolved in the aqueous solution and a solid precipitate (ATH) suspended in the solution. The dissolved caustic compounds are typically the original caustic chemicals used in the reaction with the metallic Al or alloy. These include, but are not limited to, NaOH, KOH, $NH_4OH$ and organic base hydroxides (choline base). If the starting solution is substantially free of dissolved carbonate (and is kept that way via exclusion of air) the precipitate is a carbonate-free mixed metal hydroxide, one form of which is known as meixnerite [$Mg_6Al_2(OH)_{18}.4H_2O$]. A flow chart showing an embodiment of such process is shown in FIG. 3.

Figure 4:
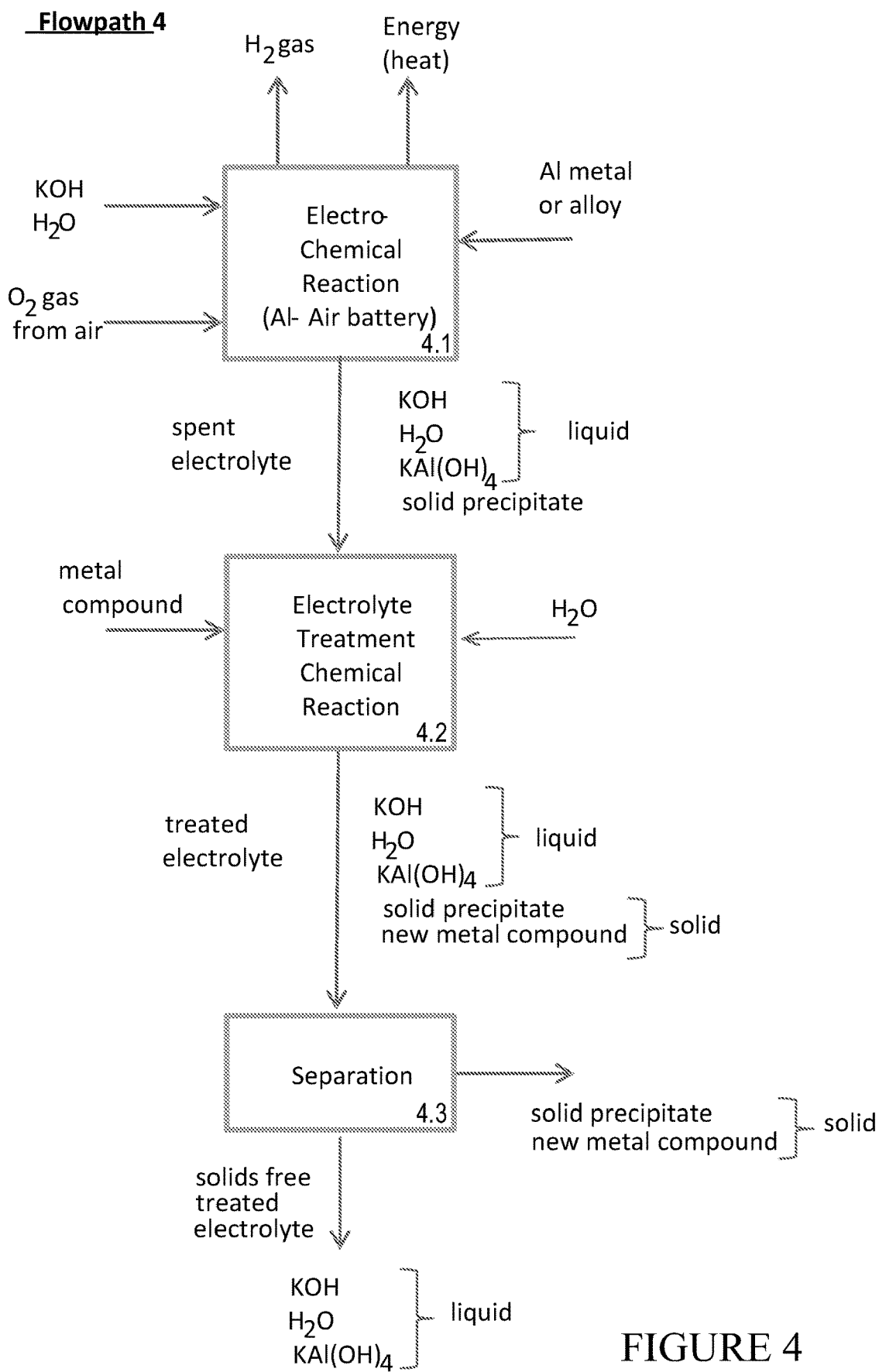
FIG. 4 is a flow chart showing the formation of "new metal compound" from spent electrolyte solutions comprising aluminate. The "metal compound" refers to metal B ions of this invention. The 'solid precipitate" refers to aluminum tri-hydroxide (ATH). The "new metal compound" refers to LDH formation.

In one embodiment, this invention provides a process for the formation of LDH as described in Example 4. According to this aspect and in one embodiment, aqueous electrolyte solution such as the solution formed in Example 2 is treated to chemically convert (regenerate) the dissolved aluminate compounds producing a dissolved caustic compound and a mixed metal solid (LDH) suspended in the aqueous electrolyte. The conversion/regeneration is accomplished by addition of metal B ions (oxide, hydroxide, salt) to the aqueous electrolyte. The metal B ions can be added as solid powder, as an aqueous solution of dissolved metal salt or a mixture thereof. The reaction between the dissolved aluminate and the added metal B ions produces a solid precipitate (LDH) and produces a caustic compound (e.g. KOH) that remains dissolved in the aqueous electrolyte. The dissolved caustic compounds are typically the original caustic chemicals used in the electrolytic reaction with the metallic Al or alloy. These include, but are not limited to, NaOH, KOH, $NH_4OH$ and organic base hydroxides (choline base). If the starting electrolyte is substantially free of dissolved carbonate (and is kept that way via exclusion of air) the precipitate is a carbonate free mixed metal hydroxide, one form of which is known as meixnerite [$Mg_6Al_2(OH)_{18}.4H_2O$]. A flow chart showing an embodiment of such process is shown in FIG. 4.

Figure 5:
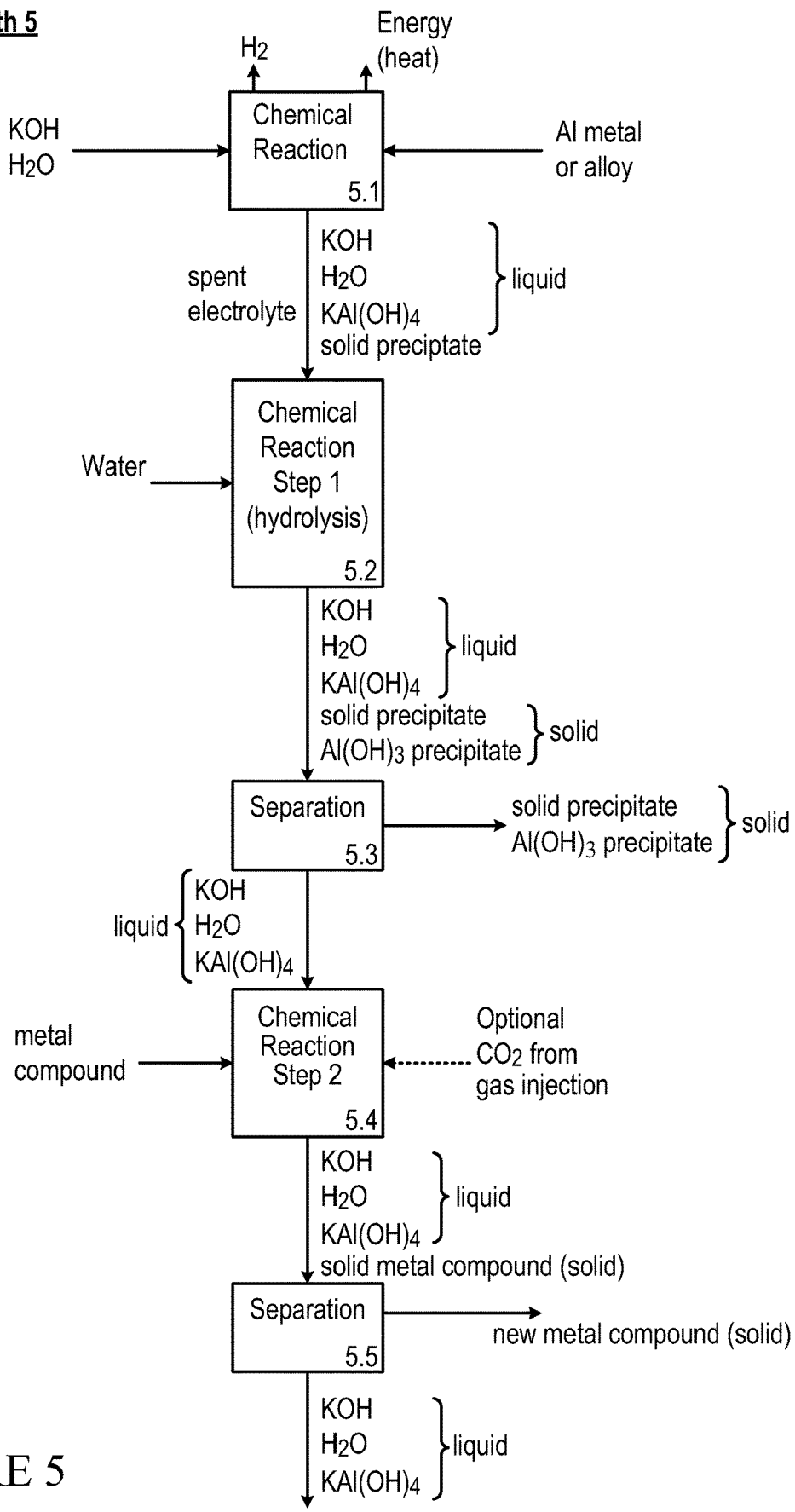
FIG. 5 is a flow chart showing the two-step regeneration process of an alkaline solution.

In one embodiment, this invention provides a process for the regeneration of the alkaline solution and formation of LDH and ATH described in Example 5 and in FIG. 5. According to this aspect and in one embodiment, the aqueous aluminate solution described in Example 1 is used in a stepwise treatment process to regenerate the original caustic compound and sequentially produce two different solid precipitates (ATH and LDH). In the first step, water is added to the aluminate solution to cause a hydrolysis reaction that produces a precipitate of aluminum tri-hydroxide [$Al(OH)_3$] also known as ATH. The hydrolysis reaction also generates a caustic compound that remains dissolved in the aqueous solution along with unreacted aluminate. The solid ATH is removed from the solution and the solids free solution undergoes a second processing step. In this second step, a metal B ion (oxide, hydroxide, salt) is added to the aqueous aluminate solution. The metal B ion can be added as solid powder, as an aqueous solution of dissolved metal salt or a mixture thereof. The reaction between the dissolved aluminate and the added metal B ion produces a caustic compound that remains dissolved in the aqueous solution and a solid precipitate (LDH) suspended in the solution. The dissolved caustic compounds are typically the original caustic chemicals used in the reaction with the metallic Al or alloy. These include, but are not limited to, NaOH, KOH, $NH_4OH$ and organic base hydroxides (choline base). If the starting solution is substantially free of dissolved carbonate (and is kept that way via exclusion of air) the precipitate is a carbonate free mixed metal hydroxide, one form of which is known as meixnerite [$Mg_6Al_2(OH)_{18}.4H_2O$]. Contact with air or a process gas stream containing $CO_2$ results in removal of $CO_2$ from the gas and incorporation of the $CO_2$ into the precipitate solid structure as carbonate. The contact with $CO_2$ described above results in fixation of the gaseous $CO_2$ into a solid form and produces a solid hydroxy-carbonate material, one form of which is known as hydrotalcite [$Mg_6Al_2(OH)_{16}CO_3.4H_2O$]. A flow chart showing an embodiment of such process is shown in FIG. 5.

In one embodiment, this invention provides a process for the regeneration of an electrolyte solution and formation of LDH and ATH as described in Example 6. According to this aspect and in one embodiment, a stepwise process is described, using spent electrolyte solution such as the solution described in Example 2. The stepwise process comprises regeneration of an original caustic compound and a sequential production of two different solid precipitates (ATH and LDH).

Figure 6:
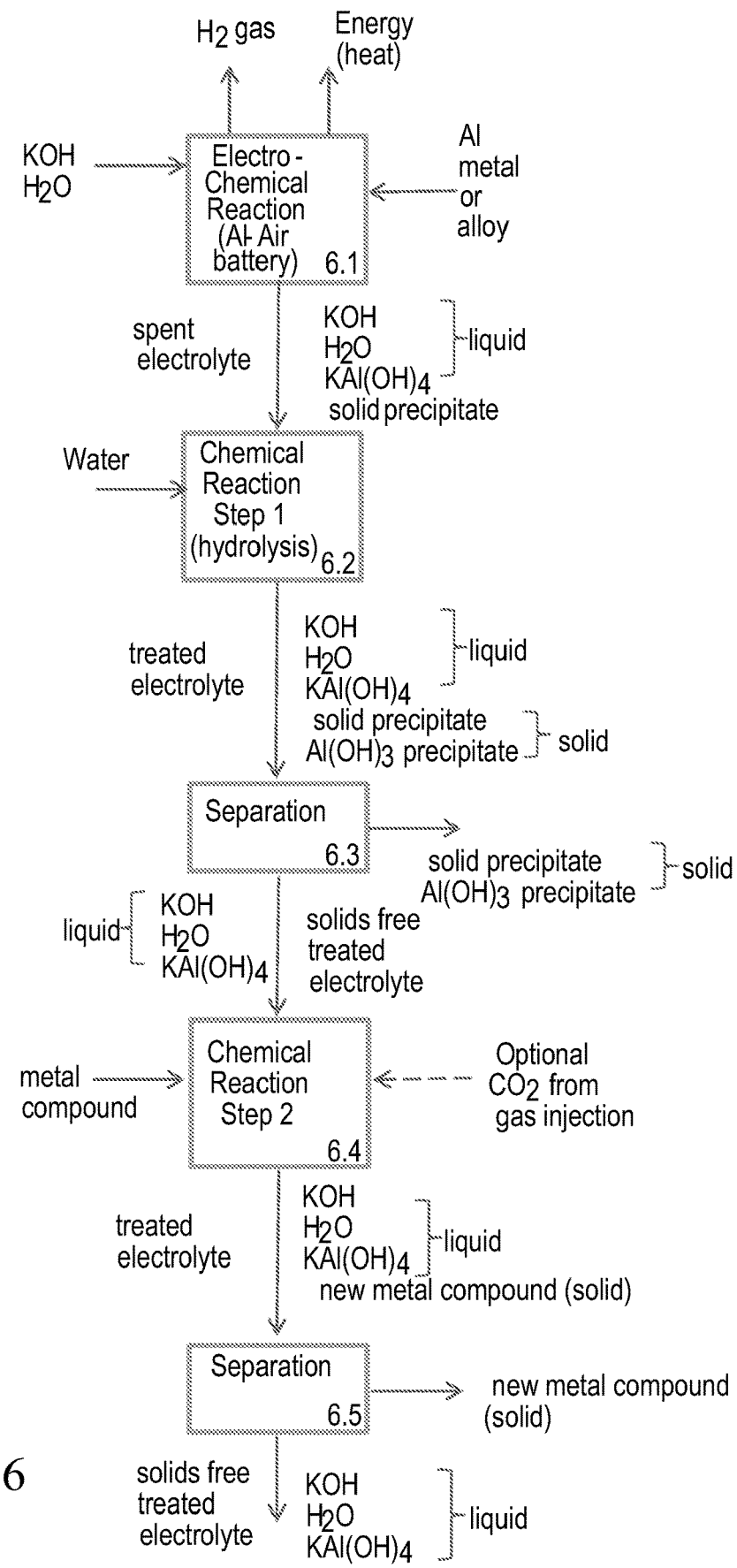
FIG. 6 is a flow chart showing the stepwise processing of spent electrolyte solution.

In the first step, water is added to the spent electrolyte (aluminate) solution to cause a hydrolysis reaction that produces a precipitate of aluminum tri-hydroxide [$Al(OH)_3$] also known as ATH. The hydrolysis reaction also generates a caustic compound that remains dissolved in the treated electrolyte along with unreacted aluminate. The solid ATH is removed from the solution and the solids free treated electrolyte undergoes a second processing step. In this second step, metal B ion (oxide, hydroxide, salt) is added to the treated electrolyte solution. The metal B ion can be added as solid powder, as an aqueous solution of dissolved metal salt or a mixture thereof. The reaction between the dissolved aluminate in the treated electrolyte and the added metal B ion produces a caustic compound that remains dissolved in the aqueous solution and a solid precipitate (LDH) suspended in the treated electrolyte. The dissolved caustic compounds are typically the original caustic chemicals used in the reaction with the metallic Al or alloy. These include, but are not limited to, NaOH, KOH, $NH_4OH$ and organic base hydroxides (choline base). If the starting solution is substantially free of dissolved carbonate (and is kept that way via exclusion of air) the precipitate is a carbonate free mixed metal hydroxide, one form of which is known as meixnerite [$Mg_6Al_2(OH)_{18}.4H_2O$]. Contact with air or a process gas stream containing $CO_2$ results in removal of CO2 from the gas and incorporation of the $CO_2$ into the precipitate solid structure as carbonate. The contact with $CO_2$ described above results in fixation of the gaseous $CO_2$ into a solid form and produces a solid hydroxy-carbonate material, one form of which is known as hydrotalcite [$Mg_6Al_2(OH)_{16}CO_3.4H_2O$]. A flow chart showing an embodiment of such process is shown in FIG. 6.

Figure 7:
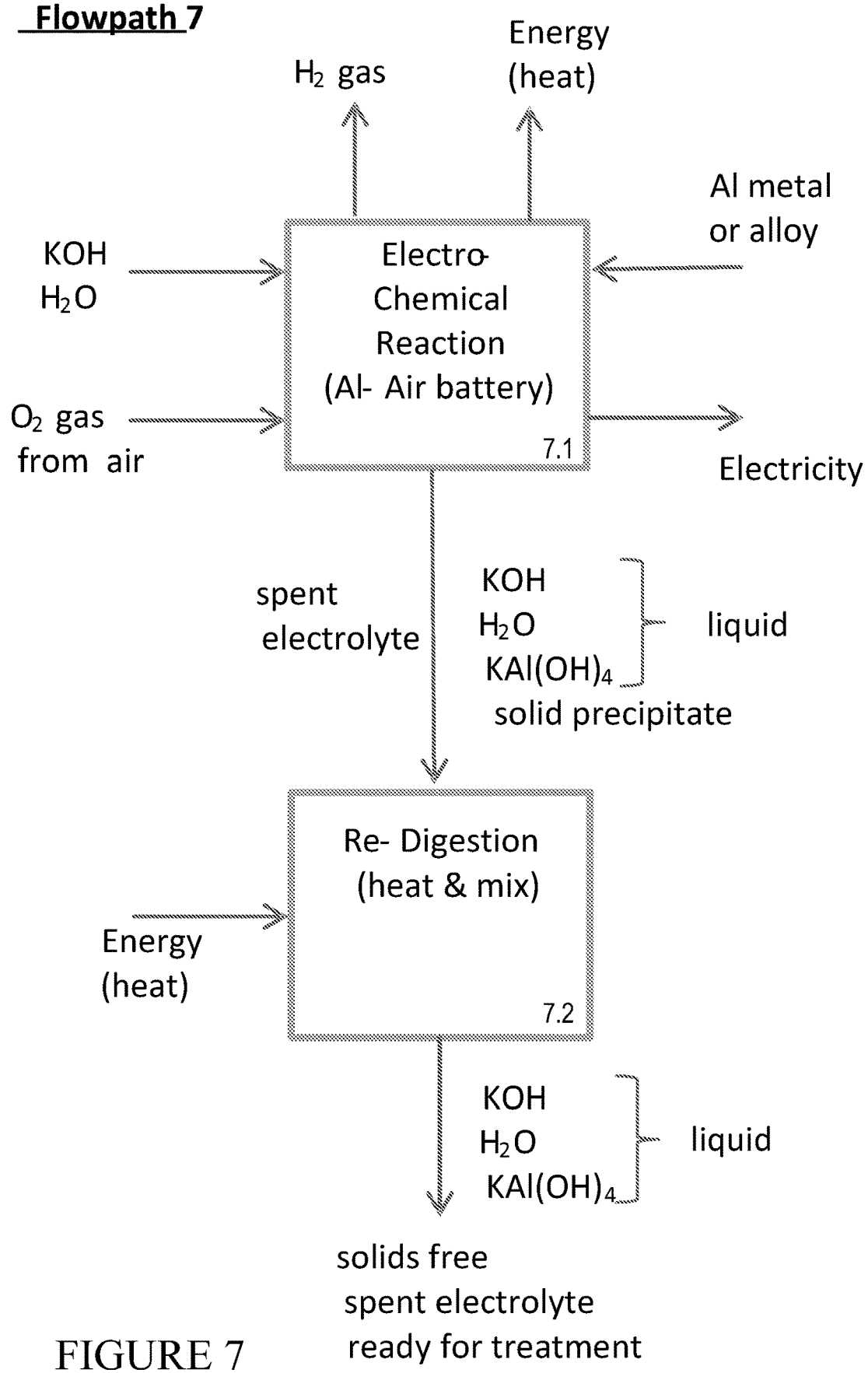
FIG. 7 is a flow chart showing a process wherein spent electrolyte solution undergoes re-digestion prior to subsequent treatments.

In one embodiment, this invention provides a process as described in example 7. According to this aspect and in one embodiment, a spent electrolyte solution (such as the solution described in example 2) undergoes an initial processing step prior to the subsequent treatments. This initial step, known as re-digestion, consists of heating and agitating the spent electrolyte to re-dissolve any aluminum tri-hydroxide precipitate that may have formed during storage of the spent electrolyte prior to the subsequent treatments. After the re-digestion step, the spent electrolyte can be treated using any of the methods described previously in Examples 3, 4, 5 or 6. A flow chart showing an embodiment of such process is shown in FIG. 7.

Figure 8:
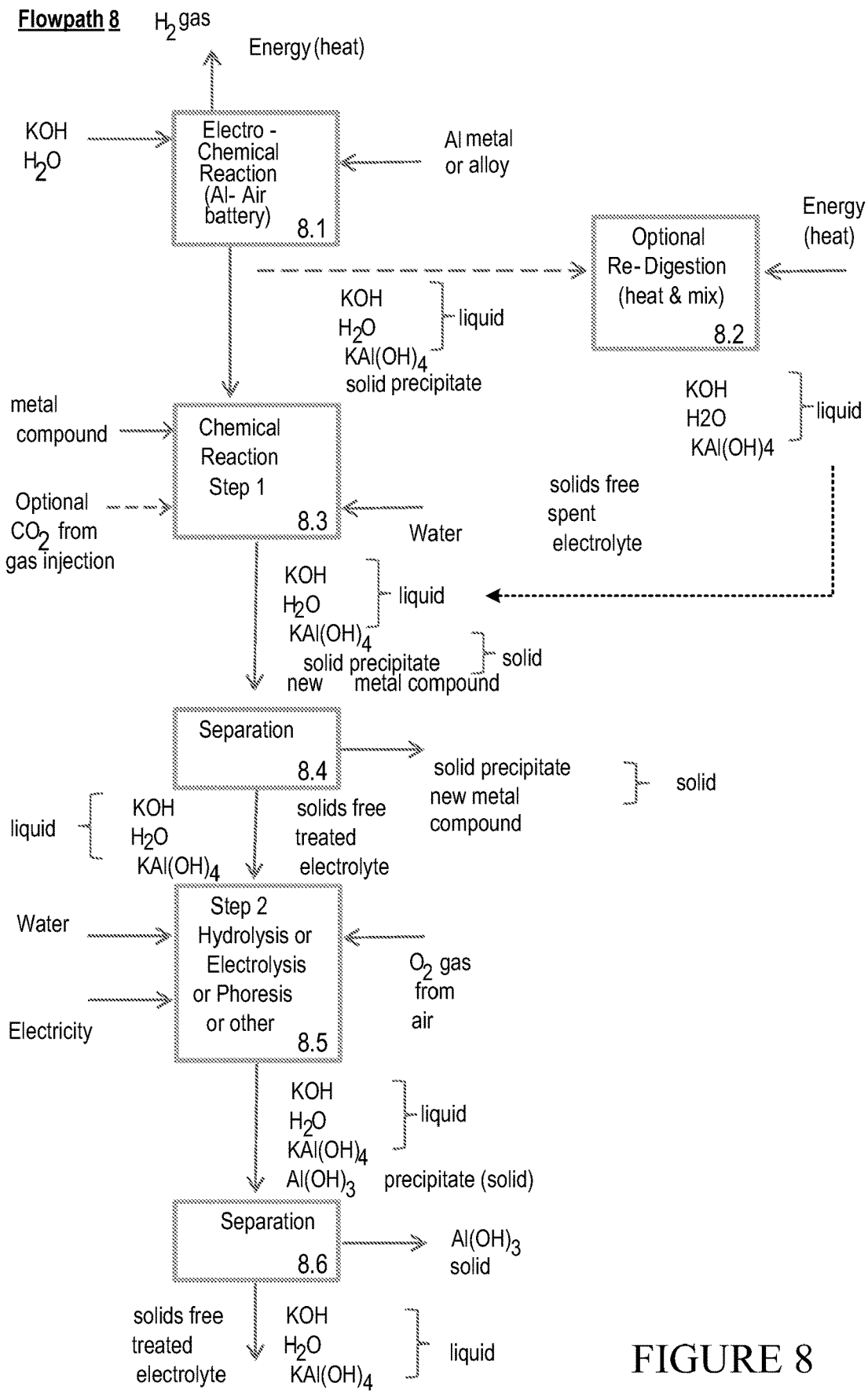
FIG. 8 is a flow chart showing stepwise treatment schemes wherein the first step is addition of a metal compound rather than hydrolysis.

In one embodiment, this invention provides a process as described in example on the FIG. 8. According to this aspect and in one embodiment, a process whereby the sequence of stepwise treatment pathways described in examples 5, 6 and 7 can be reversed such that the first step becomes the addition of the metal compound rather than hydrolysis. For this case, metal B ion (oxide, hydroxide, salt) is added to the spent electrolyte solution. The metal B ion can be added as solid powder, as an aqueous solution of dissolved metal salt or a mixture thereof. The reaction between the dissolved aluminate in the spent electrolyte and the added metal B ion produces a caustic compound that remains dissolved in the electrolyte, along with some unreacted aluminate, and a solid precipitate (LDH) suspended in the treated electrolyte. The dissolved caustic compounds are typically the original caustic chemicals used in the reaction with the metallic Al or alloy. These include, but are not limited to, NaOH, KOH, $NH_4OH$ and organic base hydroxides (choline base). If the starting solution is substantially free of dissolved carbonate (and is kept that way via exclusion of air) the precipitate is a carbonate free mixed metal hydroxide, one form of which is known as meixnerite [$Mg_6Al_2(OH)_{18}.4H_2O$]. Contact with air or a process gas stream containing $CO_2$ will result in removal of $CO_2$ from the gas and incorporation of the $CO_2$ into the precipitate solid structure as carbonate. The contact with $CO_2$ described above results in fixation of the gaseous $CO_2$ into a solid form and produces a solid hydroxy-carbonate material, one form of which is known as hydrotalcite [$Mg_6Al_2(OH)_{16}CO_3.4H_2O$]. The solid precipitate is removed from the treated electrolyte prior to the second treatment step. In the second treatment step, the residual aluminate in the solids free treated electrolyte solution is removed by precipitation of aluminum tri-hydroxide. The precipitation can be accomplished via a number of methods. Examples of these methods include, but are not limited to, hydrolysis (previously described), electrochemical reaction and phoresis technology. During the precipitation process, the original caustic metal compound is regenerated and remains dissolved in the treated electrolyte solution. The aluminum tri-hydroxide precipitate is removed from the treated electrolyte solution and the solids free solution in suitable for reuse as electrolyte in the Al-Air battery. A flow chart showing an embodiment of such process is shown in FIG. 8.

In one embodiment, this invention provides a system for production of energy from aluminum metal wherein the system includes a reagent regeneration system that can be easily used for the production of a valuable material as a by-product. In one embodiment, this invention provides a system for chemical production of energy from aluminum metal that includes a reagent regeneration system that can be easily used for the production of a valuable material as a by-product. In one embodiment, systems of this invention are reagent regeneration systems.

Figure 9:
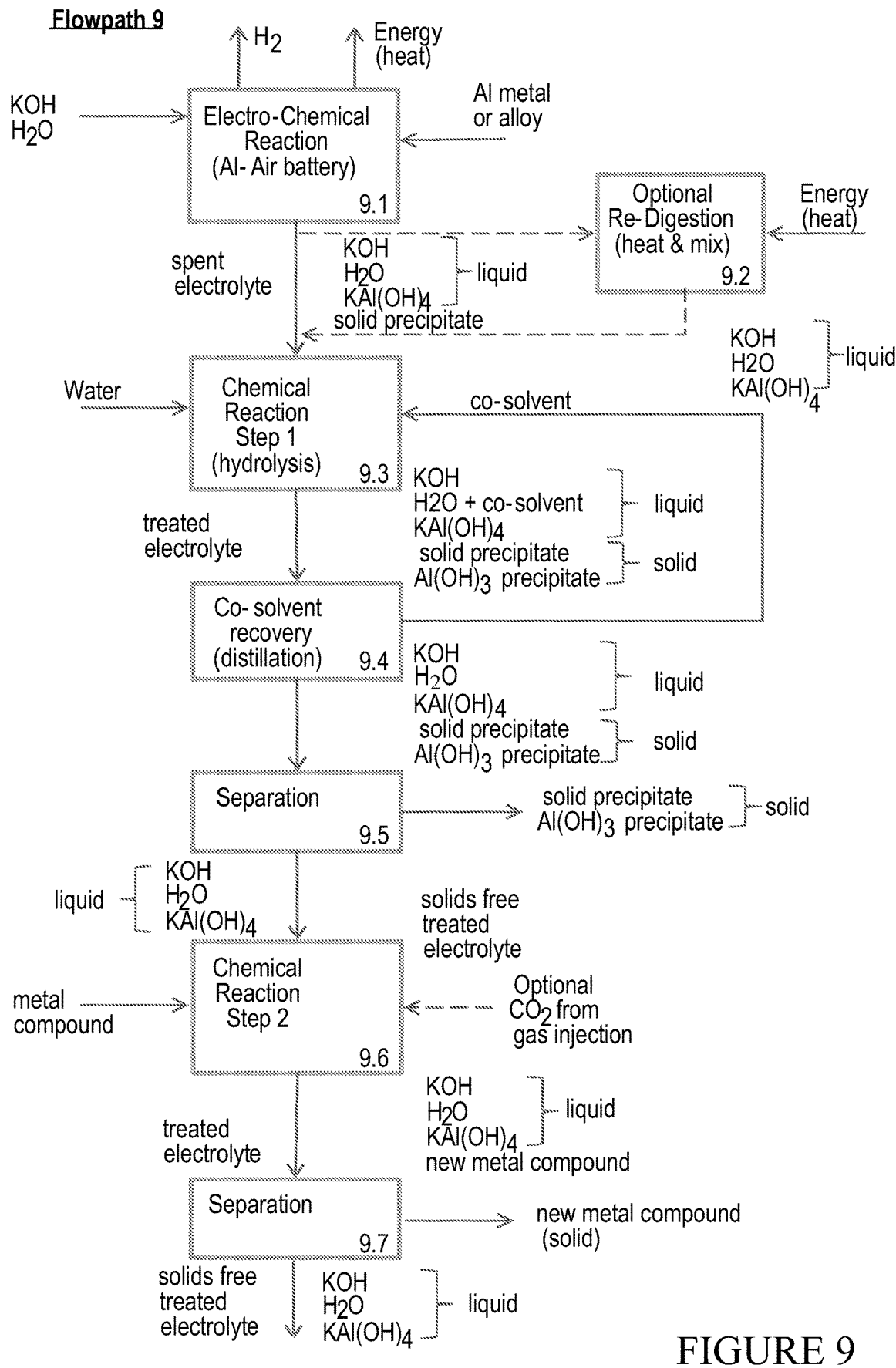
FIG. 9 is a flow chart showing stepwise treatment that includes steps of: spent electrolyte re-digestion (optional), hydrolysis, and reaction with metal compound additive; whereas co-solvent is applied on the step of hydrolysis in purpose to improve the efficiency of the process.

In one embodiment, this invention provides a process as described for example in FIG. 9. According to this aspect and in one embodiment, FIG. 9 demonstrates a process comprising the sequence of stepwise treatment pathways described in Examples 5, 6 and 7, with modification of co-solvent application on the step of hydrolysis (process 9.3). Said co-solvent is liquid that is added, along with water, to the spent electrolyte at the hydrolysis step, which improves the process efficiency regarding the conversion of aluminate compound into ATH, and allows the reduction of the amount of water added to the electrolyte and the alkali concentration decrease corresponding to that addition. After hydrolysis process is finalized, co-solvent is recovered from the mixture (e.g. by distillation), and recycled in the process. Co-solvent recovery may be performed before the solids separation step (as shown in FIG. 9), or after that. Examples of such co-solvents are alcohols (such as methanol, ethanol, iso-propanol), ketones, or other organic solvents.

Figure 10:
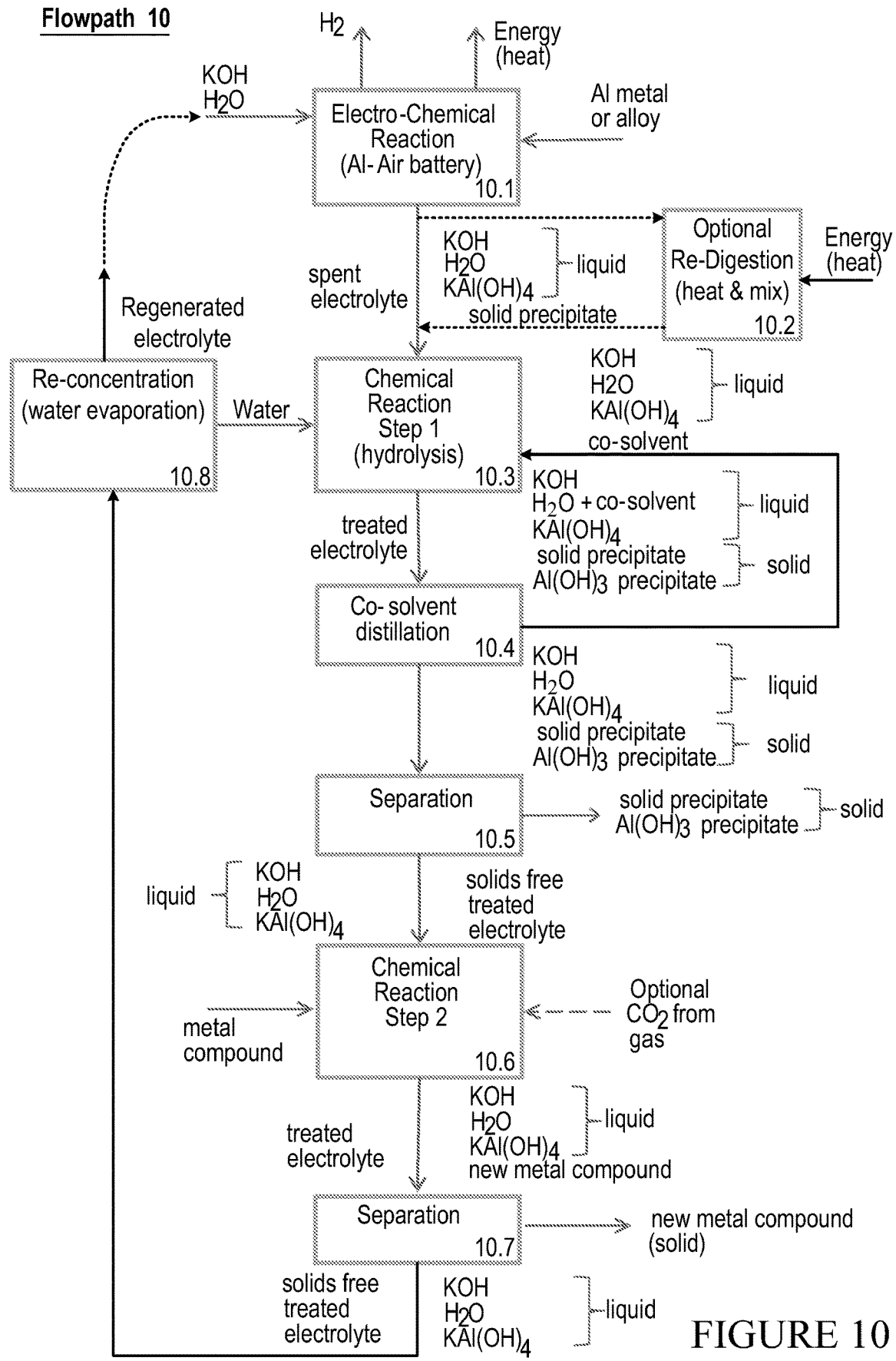
FIG. 10 is a flow chart showing stepwise treatment that includes steps of: spent electrolyte re-digestion (optional), hydrolysis, reaction with metal compound additive, and the final step of re-concentration (by partial water evaporation) in order to correct the concentration of regenerated electrolyte prior to use in the battery.

In one embodiment, this invention provides a process as described in the example shown in FIG. 10. According to this aspect and in one embodiment, a process whereby the sequence of stepwise treatment pathways described Example 9 is described, with the addition of a re-concentration step. Process sequence as described in the previous example (FIG. 9) produces the solids-free solution with fairly low (or negligible) content of aluminate compound, while almost all the alkali is recovered as free hydroxide. However, this solution is diluted in a certain extent, because of water addition at the hydrolysis step. In order to restore the initial alkali concentration (and, e.g. re-use this solution as an electrolyte for battery operation) excessive water is removed by evaporation (process step 10.8). Water, evaporated from electrolyte at the re-concentration step is re-used in the process for the hydrolysis reaction.

Figure 11:
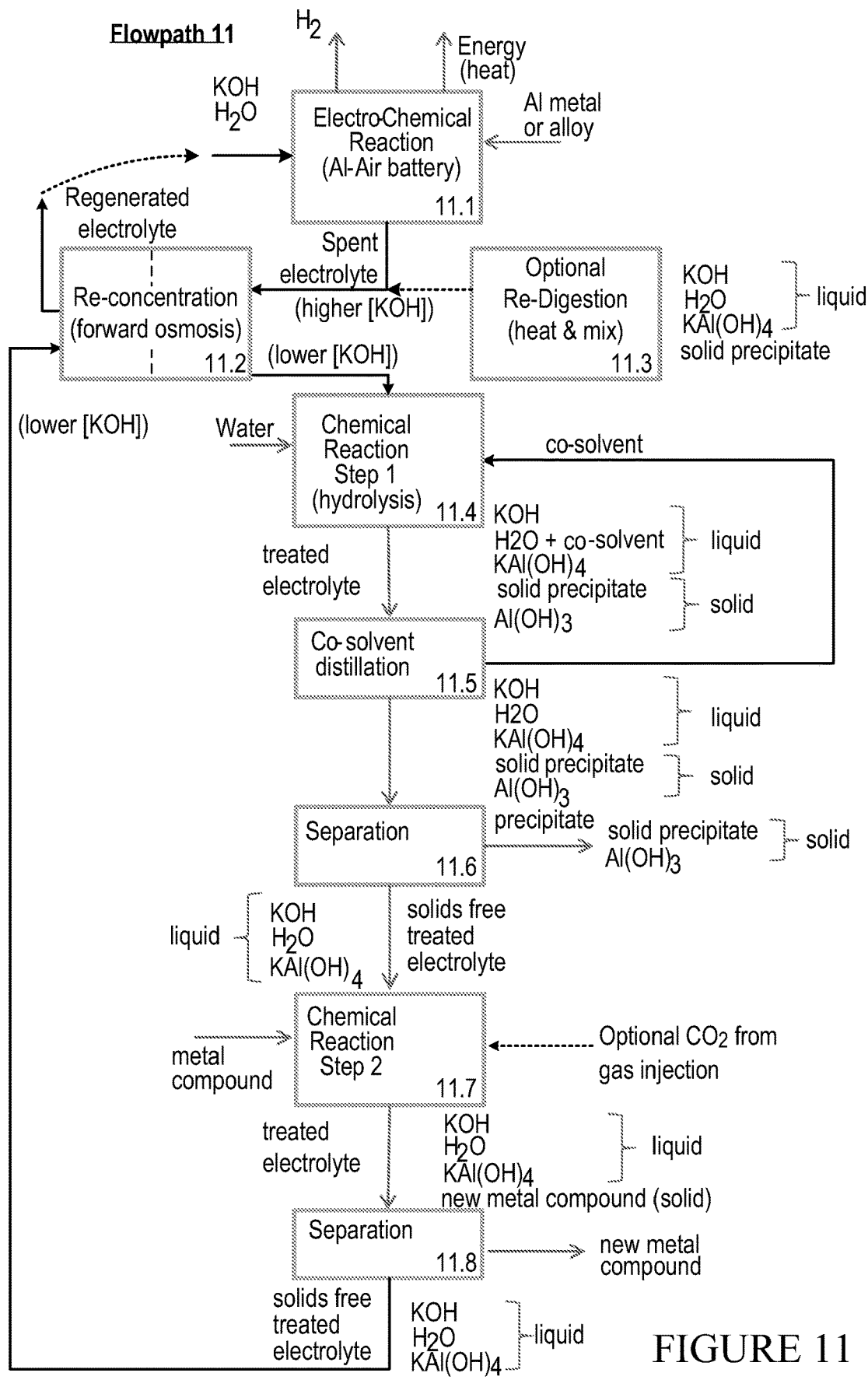
FIG. 11 is a flow chart showing stepwise treatment that includes steps of: spent electrolyte re-digestion (optional), hydrolysis, reaction with metal compound additive, and the final step of re-concentration by the process of forward osmosis in the membrane apparatus, versus the flow of spent electrolyte that is then directed to hydrolysis treatment.
Figure 12:
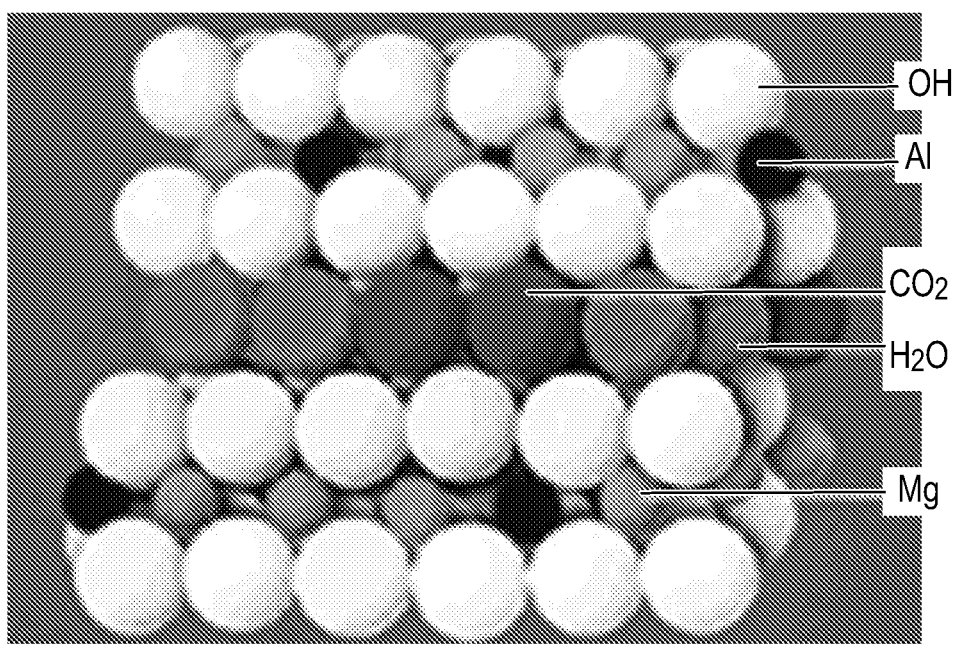
FIG. 12 is a representation of hydrotalcite structure.

In one embodiment, this invention provides a process as described in the example shown in FIG. 11. According to this aspect and in one embodiment, a process whereby the sequence of stepwise treatment pathways described example 10 is shown, while the re-concentration process is carried out by forward osmosis in a membrane apparatus (instead of an evaporation process). Said apparatus essentially consists of two chambers divided by a semi-permeable membrane. Said membrane has a property of selective permeability to alkali, while being much less permeable (or practically impermeable) to the aluminate compound. Examples of such membranes are cellulose films (e.g. battery-grade Innovia Cellophane™), ion-exchange membranes (such as Neocepta®, DuPont Nafion™, Fumatech Fumasep®), or other alkali-compatible osmosis membranes. The process may be implemented in static or continuous flow apparatus, which provides the mass transfer of alkali through semi-permeable membrane from spent electrolyte flow, which enters the treatment process, to the regenerated electrolyte flow, coming out of the treatment sequence. The driving force of the process is alkali concentration gradient, which is in favor of alkali transport to the regenerated electrolyte flow. Depending on the properties of the membrane, water transport may occur as well to a certain extent, while water concentration gradient is in the opposite direction—from the regenerated electrolyte flow (higher water content) to the spent electrolyte (lower water content). The result of this process step is more concentrated regenerated electrolyte (which is in favor of it's further utilization), and spent electrolyte with less alkali content (which is in favor of further regeneration processes).

In one embodiment, this invention provides a system for electro-chemical production of energy from aluminum metal and oxygen (air) that includes a reagent regeneration system that can be easily used for the production of a valuable material as a by-product.

In one embodiment, this invention provides a system for production of energy, said system comprises an energy production unit and a reagent regeneration unit, wherein said energy production unit comprises a cathode, an anode and an electrolyte solution, wherein said anode comprising a metal or a metal alloy and wherein said alloy comprises metals A and B.

In another embodiment the system of this invention includes an energy production unit and a reagent regeneration unit. In another embodiment, the energy production unit and the regeneration units comprise inlets and outlets for introduction and transfer of materials to and from said units. In another embodiment, the energy production unit is a hydrogen generator or an aluminum-air battery. In another embodiment, the energy production unit utilizes oxygen from said air. In another embodiment, the energy production unit, the reagent regeneration unit or combination thereof comprises an inlet for introduction of metal B ions. In another embodiment, the metal B ion is selected from a group consisting of Ca, Mg, Ba, Sr and compounds of thereof. In another embodiment, the metal B ion is a metal-oxide, or metal-hydroxide, or water-soluble salt.

In one embodiment, systems of this invention produce aluminum tri-hydroxide (ATH). In one embodiment, systems of this invention produce aluminum-based layered double hydroxides (LDH). In one embodiment, systems of this invention produce ATH and LDH.

In one embodiment, systems of this invention produce both ATH and LDH products, while the ratio between ATH and LDH production may be intentionally varied in a wide range by changing the conditions of the regeneration process.

In another embodiment, during operation, energy is produced by the energy production unit while solid LDH is produced in the energy production unit, regeneration unit or a combination thereof.

Figure 13:
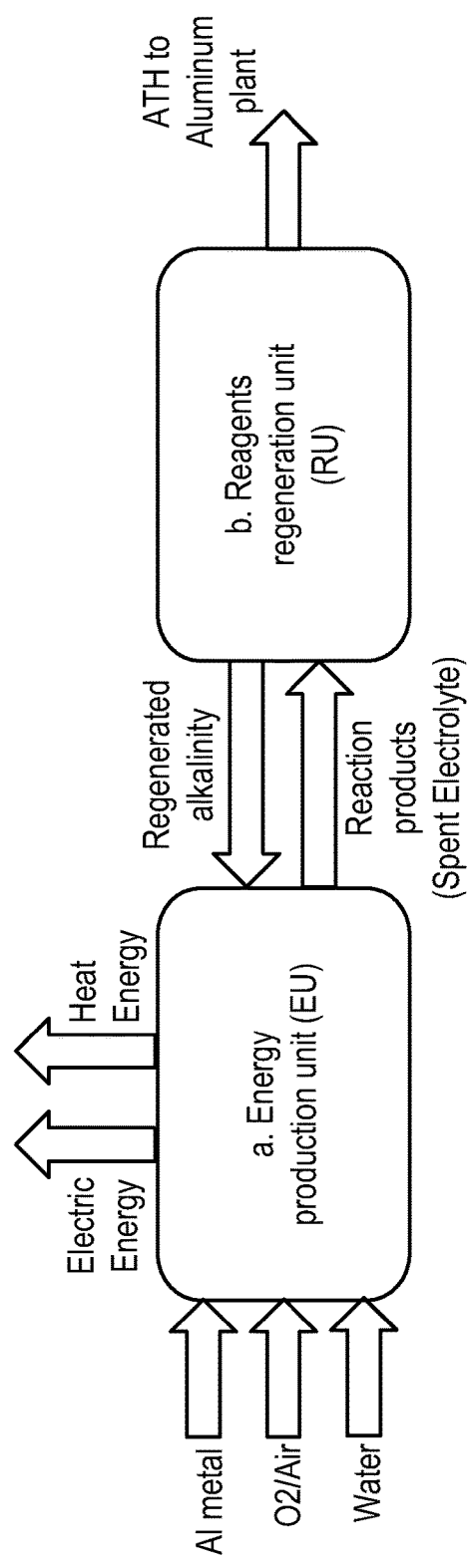
FIG. 13 is a schematic presentation of the system of this invention, comprising of Energy production unit, and Electrolyte regeneration unit, wherein aluminum metal, consumed in the Energy production unit is removed from the system in a form of ATH.

In one embodiment, systems of the invention comprise two principal units, which can work either in parallel as a single unit, or can be independently operated as two stand-alone units. A scheme showing such system is represented in FIG. 13. The system comprises an energy production unit (EU) and a reagent regeneration unit (RU). In some embodiment, systems of the invention refer to the reagent regeneration unit.

In one embodiment, the energy production unit comprises one of the following: an aluminum-air battery or a hydrogen generator (aluminum-alkaline) connected to a hydrogen fuel cell. In both cases, the operation cycle of the EU ends up having the aluminum metal dissolved in the aqueous electrolyte solution that forms the outgoing flow of reaction products, the spent electrolyte (SE). The SE comprises essentially aqueous aluminate solution. The SE is transferred into the reagent regeneration unit (RU).

The RU consists essentially of two principal blocks:
- precipitation reactor—where SE undergoes treatment causing the decomposition of aluminate compound into ATH precipitate and free alkalinity. This treatment can be done using hydrolysis, electrolysis, dialysis or combination of.
- separation block—where ATH precipitate is separated, washed, and delivered out of the system as an essentially solid product, while enriched alkaline solution is recirculated back to the EU operation cycle.

In one embodiment, at normal operation mode with regards to material balance, the system consumes aluminum metal, oxygen (air) and water, and produces nearly solid ATH that may be used for technical needs, or transferred to an aluminum plant for aluminum metal production.

Figure 14:
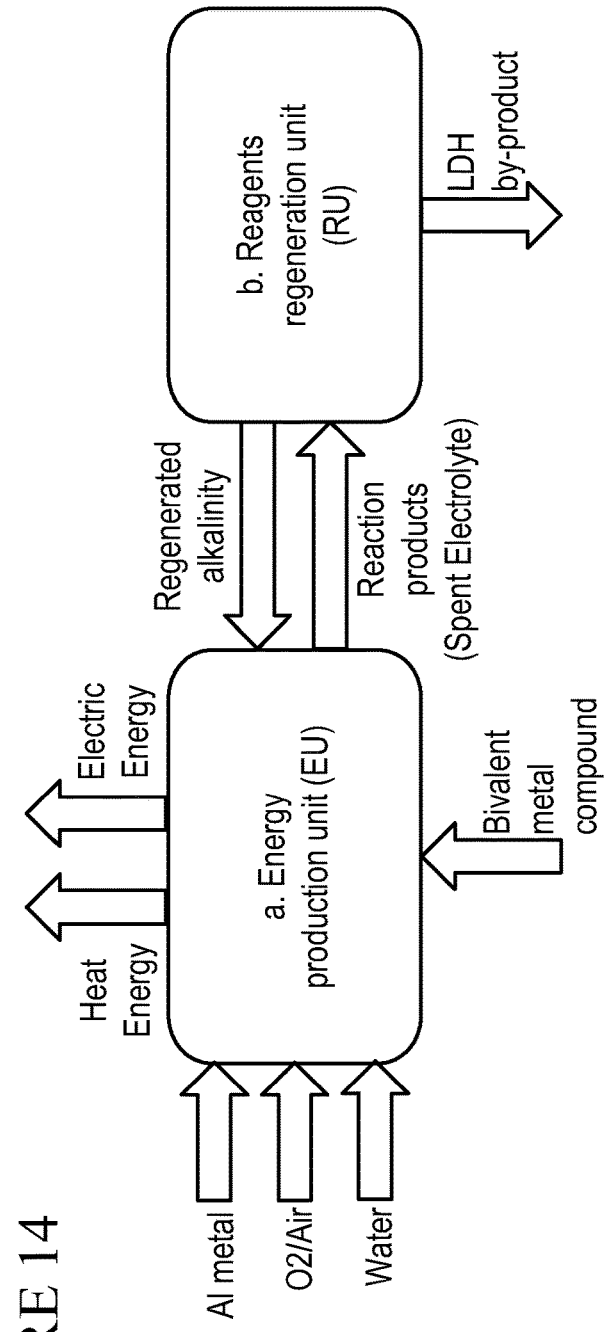
FIG. 14 is a schematic presentation of the system of this invention including an inlet for metal B ions of this invention and an out let for LDH.

In one embodiment, system of the invention comprise two principal units, which can work either in parallel as a single unit, or can be independently operated as two standalone units. A scheme showing such system is represented in FIG. 14. The system comprises an energy production unit (EU) and a reagent regeneration unit (RU).

In one embodiment this invention provides a reagent regeneration process for electrolyte solution, wherein metal B ions (bivalent metal such as Ca, Mg, Ba, Sr) can be added to the system during system operation. In another embodiment, the metal B ion is added in different forms: as an alloying metal, as oxide, as hydroxide, or as a water-soluble salt without affecting the energy production operation cycle, and without affecting energy production performance.

Adding metal B ions into the system includes but not limited to the following forms:
- as an alloy—in the aluminum metal "fuel";
- as an oxide, an hydroxide or a water-soluble salt—in the electrolyte of a hydrogen generator, or a working aluminum-air battery;
- as an oxide, hydroxide or a water-soluble salt—in the spent electrolyte stream before treatment in the RU;
- as an oxide, hydroxide, or a water-soluble salt—in the partly regenerated alkaline solution (in the case where it still contains residual aluminate compound).

Addition of metal B ions in the media of aqueous alkaline electrolyte forms the corresponding oxide-hydroxide which in turn, in the presence of aluminate compound will spontaneously form mixed metal hydroxide, which is known as layered double hydroxide (LDH) of the general formula: $Me_x^{III}Al_y^{III}(OH)_{(2x+2y)}(A^{n-})_{(y/n)} \cdot mH_2O$ (wherein A is an anion, e.g. $OH^-$, $CO_3^{2-}$, etc.)

Examples of LDH that can be produced in such a way include meixnerite, hydrotalcite and hydrocalumite.

In one embodiment, LDH is formed from metal B ions and aluminate compound molecule of alkalinity is released.

Accordingly, the same RU without any substantial change can produce ATH and regenerated alkalinity (at usual operation mode) and can produce LDH compound and regenerated alkalinity if metal B ion added into the system.

The two production schemes (ATH and LDH), as shown on FIGS. 13, 14 can be done at the same time or independently.

In one embodiment, operation of systems of the invention is easily and flexibly switched from ATH-production mode to LDH-production mode, or to combined operation.

In one embodiment, LDH compounds produced by the methods and systems of this invention are used as polymer fillers, fire retardants, catalysts and catalyst supports, drugs, anion-exchange materials, impurities scavengers or quality ceramic precursors.

In one embodiment, metal alloys of the invention comprise more than two metals. In one embodiment, metal alloys of the invention comprise metal A, metal B and metal C. In one embodiment, metal alloys of the invention comprise metal A, metal B and other metals. In one embodiment metal alloys of the invention comprising any number of metals.

In one embodiment, this invention provides a system for the treatment of aqueous alkaline waste solution comprising dissolved hydroxide ions of metal A, the system comprises:
  at least one reservoir;
  solid-liquid separation means;
  concentration means;
  agitation means;
  inlet for solid and liquid reagent addition;
wherein the system consumes the aqueous alkaline waste solution; and wherein the system produces a regenerated aqueous alkaline solution, comprising reduced amount of dissolved hydroxide ions of metal A or wherein the system produces a regenerated aqueous alkaline solution free of dissolved hydroxide ions of metal A.

In one embodiment, metal A is aluminum and the dissolved hydroxide ions of metal A are aluminate $[Al(OH)_4^-]$ ions.

In one embodiment, the system further produces metal A-containing solid products. In one embodiment, the metal A-containing solid products comprise aluminum-containing solid products comprising ATH, LDH or a combination thereof.

In one embodiment, the system further comprising temperature control means; distillation and reflux means; membrane separation means or a combination thereof.

In one embodiment, the source of the aqueous alkaline waste solution comprising dissolved hydroxide ions of metal A, is a chemical waste solution from a chemical process comprising oxidation of metal A or wherein the source of the aqueous alkaline waste solution comprising dissolved hydroxide ions of metal A, is spent electrolyte from an electrochemical process comprising oxidation of metal A.

In one embodiment, the system is modified to operate in a corrosive solution environment and in the presence of an organic co-solvent to perform the desired operations of the system.

In one embodiment, the system is located on-board a vehicle. In another embodiment, the system is off-board a vehicle.

In one embodiment, this invention provides a method for the treatment of aqueous alkaline waste solution comprising dissolved hydroxide ions of metal A, the method comprising:
  providing a system comprising:
    at least one reservoir;
    solid-liquid separation means;
    concentration means;
    agitation means;
    inlet for solid and liquid reagent addition;
  introducing, aqueous alkaline waste solution comprising dissolved hydroxide ions of metal A into the system;
  producing and separating solid metal A hydroxides, LDH or a combination thereof from the waste solution and reducing the amount of dissolved hydroxide ions of metal A in the waste solution, thus producing a regenerated aqueous alkaline solution, comprising reduced amount of dissolved hydroxide ions of metal A or producing a regenerated aqueous alkaline solution free of dissolved hydroxide ions of metal A.

In one embodiment, the metal A is aluminum and the hydroxide ions of metal A is aluminate $[Al(OH)_4^-]$ and the solid metal A hydroxides is ATH $[Al(OH)_3]$.

In one embodiment, the source of the aqueous alkaline waste solution comprising dissolved hydroxide ions of metal A, is a chemical waste solution from a chemical process comprising oxidation of metal A or wherein the source of the aqueous alkaline waste solution comprising dissolved hydroxide ions of metal A, is spent electrolyte from an electrochemical process comprising oxidation of metal A.

In one embodiment, during the chemical or electrochemical process, metal A is dissolved in an alkaline solution such that metal A forms dissolved metal A ions in the alkaline solution.

In one embodiment, producing solid metal A hydroxides from the waste solution comprises separating, or precipitating and separating, the solid metal A hydroxides from the solution.

In one embodiment, precipitating solid metal A hydroxides is done using an electrolysis process, a dialysis process, a hydrolysis process, osmosis, phoresis or a combination thereof.

In one embodiment, the hydrolysis process comprises adding water to the waste solution, thus causing precipitation of solid metal A hydroxides.

In one embodiment, producing solid metal A hydroxides involves the removal of dissolved hydroxide ions of metal A from the solution by decomposition of the dissolved hydroxide ions of metal A to solid metal A hydroxides and to free alkali hydroxides.

In one embodiment, producing and separating LDH from the waste solution comprises:
  adding a metal B ions to the waste solution in the reservoir to induce precipitation of LDH;
  separating the LDH from the waste solution; and
  optionally drying the LDH.

In one embodiment, prior to the addition of metal B ions the waste solution undergoes re-digestion, wherein the re-digestion comprises heating and agitating the waste solution to re-dissolve metal A solid hydroxide precipitate.

In one embodiment, this invention provides a method for the treatment of aqueous alkaline waste solution comprising dissolved hydroxide ions of metal A and metal B ions, the method comprising precipitating LDH from the aqueous alkaline waste solution.

In one embodiment, the precipitation occurs spontaneously.

In one embodiment, the source of the aqueous alkaline waste solution comprising hydroxide ions of metal A, and metal B ions, is a metal alloy comprising metal A and metal B.

In one embodiment, the aqueous alkaline waste solution comprising hydroxide ions of metal A, and metal B ions, is formed from the metal alloy comprising metal A and metal B by a chemical or by an electrochemical process.

In one embodiment, during the chemical or electrochemical process, metal A and metal B are dissolved in an alkaline solution such that the metal A forms metal A ions and the metal B forms metal B ions in the alkaline solution.

In one embodiment, the metal B ion is selected from a group consisting of Ca, Mg, Ba, Sr and compounds of thereof.

In one embodiment, the electrochemical process is the operation of a metal-air battery. In one embodiment, the metal-air battery comprises a cathode, an anode and an electrolyte solution, wherein the anode comprising the metal alloy comprising metals A and B.

In one embodiment, metal B ions comprise $Mg^{2+}$ ions. In one embodiment, metal A is aluminum.

In one embodiment, the waste solution comprising NaOH, KOH, $NH_4OH$, LiOH or organic base hydroxides (e.g. choline base). In one embodiment, the concentration of the KOH or NaOH solution varies between 20 and 45 wt %.

In one embodiment, the method further comprises filtration, centrifugation, solids cake compression, washing and dewatering and drying, solvent evaporation, or a combination thereof.

In one embodiment, the LDH comprises Al. In one embodiment, the LDH comprises meixnerite, hydrotalcite (HTC), or a combination thereof.

In one embodiment, the separating step comprises filtration, centrifugation, washing, solvent evaporation, compression, decanting, or a combination thereof.

In one embodiment, this invention provides a system for production of energy, the system comprises an energy production unit and the solution treatment system as described herein above, wherein the energy production unit comprises a cathode, an anode and an electrolyte solution, wherein the anode comprising a metal or a metal alloy and wherein the alloy comprises metals A and B.

In one embodiment, the energy production unit and the solution treatment system comprise inlets and outlets for introduction and transfer of materials to and from the units.

In one embodiment, the energy production unit is a hydrogen generator or an aluminum-air battery. In one embodiment, the energy production unit utilizes oxygen from the air.

In one embodiment, during operation energy is produced by the energy production unit while solid LDH is produced in the energy production unit, in the solution treatment system or a combination thereof.

In one embodiment the amount of non-alkali metal ions, the amount of aluminates or the amount of other non-alkali metal-hydroxide ions in solutions used in processes of this invention is reduced. In one embodiment, the amount of such metal ions or hydroxide ions is reduced by processes of this invention by 90%. In one embodiment, it is reduced by 80% from its amount before the process. In one embodiment, the amount of such ions is reduced to below 50%, below 40%, below 30%, below 20%, below 10%, below 5% or below 1% or below 0.1% of the amount of these ions before processing by systems and methods of this invention. In one embodiment, % is weight percent. In one embodiment, the amount of these ions is zero in solutions regenerated by systems and methods of this invention. In one embodiment, the amount of these ions is negligible in solutions regenerated by systems and methods of this invention.

Definitions:

In the description of this invention, the terms "aluminate" and "aluminate compound" refer to hydrated aluminate, of the general formula $MAl(OH)_4$ (whereas M is metal other than aluminum), presenting in the aqueous solution, in the dissolved form.

Accordingly, the term "aluminate ion" in the description of this invention refers to tetrahydroxyaluminate ion of formula $Al(OH)_4$.

In one embodiment, this invention provides methods wherein a metal comprising metal A or a metal alloy comprising metal A and metal B is dissolved in an alkaline solution wherein the dissolution is performed chemically or electrochemically. Chemical dissolution of a metal or a metal alloy means that an oxidation/reduction process between the metal and a reagent in the solution occurs, resulting in the formation of metal A ions/metal B ions from metal A/metal B. Once Metal A ions/metal B ions are formed, they dissolve in the solution or in the liquid that is in contact with the metal/metal alloy. This process is a chemical process. Electro-chemical dissolution of a metal or a metal alloy, means that an oxidation/reduction process of a metal in one electrode occurs in conjunction with an oxidation/reduction process occurring on another electrode and the two electrodes are electrically-connected (e.g. in a discharge mode of a battery). Such electrochemical process results in the formation of metal A ions/metal B ions from metal A/metal B. Once Metal A ions/metal B ions are formed, they dissolve in the solution or in the liquid that is in contact with the metal/metal alloy. This process is an electro-chemical process.

"On-board" means that the unit or system referred to is placed or located "on" or "in" or "within" or "on top" of the vehicle in which the battery is installed (e.g. on board the car).

Off-board means that the unit or system referred to is placed or located at a place outside or at a distant from the vehicle carrying a battery of the invention. Off-board means not "on" or not "in" or not "within" or not "on top" of the vehicle in which the battery is installed (e.g. off-board the car). In one embodiment, Off board location is a gas station, a road-side station, a garage, a parking lot, a home, a warehouse, an auto-care center etc.

Metal A and/or metal B and other metals used in methods and systems of this invention as pure metals or in alloys comprise any metal known in the art. In one embodiment, Metal A and/or metal B and other metals used in methods and systems of this invention as pure metals or in alloys comprise Al, Ca, Zn, Fe, Ni, La, Mg, Li, Sn, Zn, Ga or combinations thereof. In one embodiment, metals used in systems and methods of this invention comprise Cu, Cr, Co, In or combinations thereof.

Alkaline or alkaline solution is a basic solution Alkaline solution is a solution with a pH value greater than 7.0. An alkaline solution is a solution comprising a base. An example of alkaline solution is a solution of KOH or NaOH dissolved in water. In some embodiments, caustic solutions are highly basic solutions or concentrated alkaline solutions.

Embodiments of this invention that refer to spent electrolyte may refer to any other alkaline solution that comprises hydroxides and both alkali and non-alkali ions. Embodiments of this invention that refer to spent electrolyte may refer to any other alkaline solution that comprises non-alkali metal ions and hydroxides.

In one embodiment, a metal alloy is a mixture comprising two or more metals.

Aluminates are ions comprising aluminum ions and hydroxide ions. Aluminates can be represented by $Al(OH)_4$. Embodiments of this invention that refer to aluminates may refer to other metal hydroxide ions as well (i.e. hydroxides wherein the metal is not Al but another metal).

In one embodiment, the system for the treatment of aqueous alkaline waste solution is the reagent regeneration unit.

In one embodiment, spent electrolyte is used electrolyte. In one embodiment, spent electrolyte is the electrolyte obtained from a battery following operation of the battery.

In one embodiment, free alkali is alkali that is not bound to aluminate. Dissolved KOH, NaOH are examples of free alkali Bound alkali, in contrast to free alkali, is alkali that is bound to aluminate or to similar hydroxide ions, e.g. KAl(OH)$_4$.

In one embodiment, the term "a" or "one" or "an" refers to at least one. In one embodiment the phrase "two or more" may be of any denomination, which will suit a particular purpose. In one embodiment, "about" or "approximately" may comprise a deviance from the indicated term of +1%, or in some embodiments, −1%, or in some embodiments, ±2.5%, or in some embodiments, ±5%, or in some embodiments, ±7.5%, or in some embodiments, ±10%, or in some embodiments, ±15%, or in some embodiments, ±20%, or in some embodiments, ±25%.

The following examples are presented in order to more fully illustrate the preferred embodiments of the invention. They should in no way be construed, however, as limiting the broad scope of the invention.

EXAMPLES

Example 1

Chemical Reaction of Al Alloy with Alkaline Solution

Al2.5Mg metal alloy is contacted with 30 wt % aqueous KOH that is kept substantially free of dissolved carbonate by exclusion of air. The resulting chemical reaction produces heat that raises the solution temperature from ambient to >50° C. At the same time, the reaction produces hydrogen gas, dissolved potassium aluminate [KAl(OH)$_4$] and a solid precipitate of meixnerite [Mg$_6$Al$_2$(OH)$_{18}$.4H$_2$O] suspended in the aqueous solution. The ending solution will typically also contain some residual dissolved caustic compound (KOH in this example).

Example 2

Electro-Chemical Reaction of Al Alloy with Alkaline Solution

Al2.5Mg metal alloy is contacted with 30 w % aqueous KOH that is kept substantially free of dissolved carbonate by exclusion of air in an electrochemical cell. The resulting electrochemical chemical reaction produces electricity and heat that raises the solution temperature from ambient to >50° C. At the same time, the reaction produces hydrogen gas, dissolved potassium aluminate [KAl(OH)$_4$] and a solid precipitate of meixnerite [Mg$_6$Al$_2$(OH)$_{18}$.4H$_2$O] suspended in the aqueous solution. The ending solution will typically also contain some residual dissolved caustic compound (KOH in this example).

Example 3

Formation of Meixnerite from Alkaline Solutions Comprising Aluminate

Magnesium oxide powder is added to a carbonate free aqueous solution consisting of 4 w % KOH and 56 w % potassium aluminate [KAl(OH)$_4$]. The resulting chemical reaction produces KOH which remains dissolved in solution and a solid precipitate of meixnerite [Mg$_6$Al$_2$(OH)$_{18}$.4H$_2$O] suspended in the solution. The ending treated aqueous solution can also contain unreacted dissolved potassium aluminate.

Example 4

Formation of Meixnerite from Spent Electrolyte Solutions Comprising Aluminate

Magnesium oxide powder is added to a carbonate-free aqueous spent electrolyte consisting of 4 w % KOH and 56 w % potassium aluminate [KAl(OH)$_4$]. The resulting chemical reaction produces KOH which remains dissolved in the electrolyte and a solid precipitate of meixnerite [Mg$_6$Al$_2$(OH)$_{18}$.4H$_2$O] suspended in the electrolyte solution. The ending solution can also contain unreacted dissolved potassium aluminate.

Example 5

Two-Step Regeneration Process of an Alkaline Solution

In the first treatment step of an alkaline solution, water is added to a carbonate free aqueous solution consisting of 4 wt % KOH and 56 wt % potassium aluminate [KAl(OH)$_4$]. The volume ratio of water added can be anywhere from 0.5 to 3 times the volume of aluminate solution. The resulting chemical reaction (hydrolysis) produces KOH which remains dissolved in solution and a solid precipitate of aluminum tri-hydroxide [Al(OH)$_3$] suspended in the solution. The ending treated aqueous solution can also contain unreacted dissolved potassium aluminate. The precipitate [Al(OH)$_3$] is removed and the solids free aluminate solution undergoes additional treatment. In this second treatment step, magnesium oxide powder is added to the KOH/potassium aluminate solution. The resulting chemical reaction produces additional KOH which remains dissolved in the electrolyte and a solid precipitate of meixnerite [Mg$_6$Al$_2$(OH)$_{18}$.4H$_2$O] suspended in the electrolyte solution. The ending solution can also contain residual unreacted dissolved potassium aluminate. If desired, contact with air or a process gas stream containing CO$_2$ will result in removal of CO$_2$ from the gas and incorporation of the CO$_2$ into the precipitate solid structure as carbonate. The contact with CO$_2$ described above results in fixation of the gaseous CO$_2$ into a solid form and produces the solid hydroxy-carbonate material known as hydrotalcite [Mg$_6$Al$_2$(OH)$_{16}$CO$_3$.4H$_2$O].

Example 6

Stepwise Processing of Spent Electrolyte Solution

In the first treatment step of an electrolyte solution, water is added to a carbonate free aqueous spent electrolyte consisting of 4 w % KOH and 56 w % potassium aluminate [KAl(OH)$_4$]. The volume ratio of water added can be anywhere from 0.5 to 3 times the volume of spent electrolyte solution. The resulting chemical reaction (hydrolysis) produces KOH which remains dissolved in solution and a solid precipitate of aluminum tri-hydroxide [Al(OH)$_3$] suspended in the solution. The ending treated electrolyte solution can also contain unreacted dissolved potassium aluminate. The precipitate is removed and the solids free, treated electrolyte solution undergoes additional treatment. In this second processing step, magnesium oxide powder is added to the KOH/potassium aluminate solution. The resulting chemical reaction produces additional KOH which remains dissolved in the electrolyte and a solid precipitate of meixnerite [Mg$_6$Al$_2$(OH)$_{18}$.4H$_2$O] suspended in the electrolyte solution. The ending solution can also contain residual unreacted dissolved potassium aluminate. If desired, contact with air or a process gas stream containing $CO_2$ will result in removal of $CO_2$ from the gas and incorporation of the $CO_2$ into the precipitate solid structure as carbonate. The contact with $CO_2$ described above results in fixation of the gaseous $CO_2$ into a solid form and produces the solid hydroxy-carbonate material known as hydrotalcite $[Mg_6Al_2(OH)_{16}CO_3 \cdot 4H_2O]$.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Example 7

Description of the Apparatus

Along with the various processing options previously described, a novel combination of equipment has been identified as the apparatus required for performing the necessary process steps. The apparatus can be defined by describing the equipment used to perform each process step.
Production of the Energy, and Utilization of Electrolyte In one embodiment of the disclosed invention, metal or metal alloy is contacted with aqueous alkaline electrolyte. This process is facilitated by an apparatus, which essentially is a closed vessel made of alkali-resistant material, having an internal setup, allowing the arrangement of metal pieces in such a way that electrolyte may flow around in a contact with the metal pieces surface. Hydrogen gas that evolves as a result of reaction of metal with electrolyte, leaves the vessel through the gas exhaust line on the vessel top, and may be further used as a fuel for production of energy. The reaction heat is absorbed by the electrolyte mass, and then removed from the electrolyte flow by any mean of heat exchange, for further utilization. As a result of the reaction, alkaline electrolyte in the vessel accumulates products of metal dissolution. In one embodiment the metal is pure aluminum metal and the product of metal dissolution is alkali aluminate compound. In one embodiment the metal is aluminum alloy, and the products of metal dissolution are alkali aluminate compound and LDH solid precipitate. This apparatus, comprising closed vessel, means of contacting metal with electrolyte in the vessel, hydrogen exhaust line, means for electrolyte circulation, means of heat exchange, is schematically shown in FIG. 1 (1.1), FIG. 3 (3.1), and FIG. 5 (5.1).

In one embodiment metal appears in the shape of the electrode(s), and the elelctrode(s) is (are) contacted with alkaline electrolyte in the apparatus, which essentially is a metal-air battery, feed by oxygen or air. In this embodiment chemical energy of metal is converted preferably to electric energy and heat. In parallel to the process of electricity production, a process of metal direct reaction with electrolyte may occur as well, which will result in hydrogen evolution. The apparatus facilitating the process, comprising metal-air battery, electrolyte tank with hydrogen gas exhaust line, means of electrolyte circulation, and heat exchange, is schematically shown in FIG. 2 (2.1), FIG. 4 (4.1), FIG. 6 (6.1), FIG. 7 (7.1), FIG. 8 (8.1), FIG. 9 (9.1), FIG. 10 (10.1), and FIG. 11 (11.1).

Electrolyte utilized in chemical and electrochemical processes mentioned in this section (referred to as spent electrolyte) is subject to further treatment according to methods of this invention.

Production of ATH from Spent Electrolyte

As previously described, spent electrolyte of processes of energy production consists of dissolved metal, e.g. Al, in the form of alkali aluminate, e.g. potassium aluminate $(KAl(OH)4)$, and a portion of the starting potassium hydroxide (KOH) electrolyte. In order to recover ATH $(Al(OH)_3)$ from the solution, the equilibrium solubility of the $KAl(OH)_4$ must be changed. This can be accomplished by lowering the concentrations of KOH and $KAl(OH)_4$. Lowering the concentrations can be done by general dilution, adding water or another liquid phase, or by active transport of water and/or KOH to another fluid. When the dilution approach is used, a temperature controlled agitated reactor vessel is the apparatus of choice. Alternatively, the same degree of dilution/agitation can be accomplished in a continuous flowing apparatus by producing turbulent flow inside a piping circuit. This apparatus is shown in FIG. 3 (3.2), FIG. 4 (4.2), FIG. 5 (5.2), FIG. 3 (3.2), FIG. 6 (6.2), FIG. 3 (3.2), FIG. 3 (3.2), FIG. 8 (8.3), FIG. 9 (9.3), FIG. 10 (10.3), and FIG. 11 (11.4).

When active transport of water and or KOH is used to destabilize the $KAl(OH)_4$ equilibrium, a membrane electrochemical cell or membrane dialysis/phoresis apparatus is used. A schematic representation of these devices is shown in FIG. 8 (8.5).
Separation of ATH Solids from Solution The act of precipitating ATH also produces additional free KOH in solution. Both the ATH solids produced during the prior ATH precipitation step and the dissolved KOH need to be recovered from the solution. This solids/liquid separation can be accomplished using separation devices modified to handle the corrosive nature of the solution. These devices include, but are not limited to, precipitator, filter-press, centrifuge, hydrocyclone, or functionally similar devices for solids-liquid separation. The key feature of the device is that the recovery of both solid ATH and KOH solution must be maximized A schematic representation of these devices is shown in FIG. 3 (3.2), FIG. 4 (4.3), FIG. 5 (5.3), FIG. 6 (6.3), FIG. 8 (8.4), FIG. 9 (9.5), FIG. 10 (10.5), and FIG. 11 (11.6).
Co-Solvent Recovery When a co-solvent is used in ATH precipitation, the co-solvent must be removed from the resulting KOH solution before production of LDH can begin. The co-solvent can be removed by exploiting the differences in chemical and physical properties between the organic co-solvent and the aqueous KOH solution. These properties include, but are not limited to, vapor pressure, polarity and molecular size. Separation devices based on these properties are:

1. Evaporation of volatile liquids followed by condensation of vapors at a lower temperature back to liquid phase. This can be accomplished in single or multi stage distillation equipment;
2. Liquid pervaporation using selective membranes and operating at pressure below atmospheric;
3. Size exclusion membrane filtration using polymer or ceramic membrane devices operated at pressure substantially above atmospheric;
4. Diffusion membrane devices (forward or reverse osmosis) using co-current or counter current liquid flows to selectively transfer a chemical component from one liquid to another. Alternatively this can be operated in a single or multiple batch mode.

Co-solvent recovery apparatus examples schematically shown in FIG. 9 (9.4), FIG. 10 (10.4), and FIG. 11 (11.5), LDH Production The solution after co-solvent recovery is now suitable for use in production of LDH products. At this point, a suitable solid phase material must be added to the solution and brought into intimate contact with the solid phase material at elevated temperature. The choice of solid phase material is based on the type of LDH desired and can be, but is not limited to, MgO, $Mg(OH)_2$, $MgCO_3$, CaO, $Ca(OH)_2$, $CaCO_3$, LiO, LiOH, $Li_2CO_3$ and other metal oxides, hydroxides or carbonates. It is also possible to add a soluble metal salt to the solution to produce the desired LDH such as, but not limited to metal chlorides, nitrates or sulfates. However, care must be taken in selecting metal chemicals that do not detrimentally affect the performance of the KOH solution in subsequent Al-air battery reuse applications.

The devices for LDH production are functionally similar to the devices previously used for ATH production such as the temperature controlled, agitated reactor vessel and/or the turbulent circulating liquid system. The major difference being that LDH production requires a higher temperature than ATH production and does not benefit from the use of a co-solvent.

A schematic representation of these devices is shown in FIG. 9 (9.6), FIG. 10 (10.6), and FIG. 11 (11.7).

LDH and KOH Recovery

The act of producing LDH also generates additional free KOH in solution. Both the LDH solids and the dissolved KOH need to be recovered. This solids/liquid separation can be accomplished using separation devices modified to handle the corrosive nature of the solution. These devices include, but are not limited to, filter-press, centrifuge or functionally similar devices for solids-liquid separation. The key feature of the device is that the recovery of both solid LDH and KOH solution must be maximized A schematic representation of these devices is shown in FIG. 5 (5.5), FIG. 6 (6.5), FIG. 8 (8.6), FIG. 9 (9.7), FIG. 10 (10.7), and FIG. 11 (11.8).

KOH Solution Concentration Adjustment

The KOH solution remaining after the ATH and LDH production steps is ultimately intended to be reused in Al-air battery applications. As such it must be supplied at the KOH concentration needed for optimum battery operation. It is likely that the KOH solution present after ATH and LDH production will be less than the desired concentration for optimum battery reuse and will require concentration adjustment. This concentration adjustment can be accomplished several ways such as:
1. Addition of new KOH sufficient to react the desired target concentration;
2. Removal of water sufficient to obtain the target KOH concentration;
3. Transfer of KOH from a higher concentration source such as incoming spent electrolyte The apparatus for KOH addition can be an agitated mixing vessel with provision for metered addition of solid or liquid KOH. The apparatus for water removal is functionally similar to what was previously described for co-solvent removal:
1. Evaporation of volatile liquids followed by condensation of vapors at a lower temperature back to liquid phase. This can be accomplished in single or multi stage distillation equipment, as schematically represented in FIG. 10 (10.8);
2. Diffusion membrane devices (forward or reverse osmosis) using co-current or counter current liquid flows to selectively transfer a chemical component from one liquid to another, as schematically represented of FIG. 11 (11.2);
3. Liquid pervaporation using selective membranes and operating at pressure below atmospheric;
4. Size exclusion membrane filtration using polymer or ceramic membrane devices operated at pressure substantially above atmospheric.

The devices previously described can be operated in a stepwise fashion in either continuous or batch mode. It is also possible to combine, include or exclude individual apparatus and/or process steps as necessary to achieve desired process outputs.

What is claimed is:

1. A method for the treatment of aqueous alkaline waste solution comprising dissolved hydroxide ions of metal A, said method comprising:
   providing a system comprising:
   at least one reservoir;
   solid-liquid separation means;
   concentration means;
   agitation means;
   inlet for solid and liquid reagent addition;
   introducing, aqueous alkaline waste solution comprising dissolved hydroxide ions of metal A into said system;
   producing and separating layered double hydroxide (LDH), solid metal A hydroxides or a combination thereof from said waste solution and reducing the amount of dissolved hydroxide ions of metal A in said waste solution, thus producing a regenerated aqueous alkaline solution, comprising reduced amount of dissolved hydroxide ions of metal A,
   wherein said producing and separating LDH from said waste solution comprises:
   adding metal B ions to said waste solution to induce precipitation of LDH;
   separating said LDH from said waste solution; and
   optionally drying said LDH; and
   wherein the aqueous alkaline waste solution is a spent electrolyte that has been removed from a metal-air battery and the regenerated aqueous alkaline solution is then reused in the metal air battery or another metal air battery.

2. The method of claim 1, wherein said metal A is aluminum and said hydroxide ions of metal A is aluminate as $Al(OH)_4^-$ and said solid metal A hydroxides is $Al(OH)_3$.

3. The method of claim 1, wherein said aqueous alkaline waste solution is a waste solution from a chemical process comprising oxidation of metal A or a spent electrolyte from a process comprising electrochemical oxidation of metal A.

4. The method of claim 3, wherein during said chemical or electrochemical process, metal A is dissolved in an alkaline solution such that said metal A forms dissolved metal A ions in said alkaline solution.

5. The method of claim 1, wherein said producing solid metal A hydroxides from said waste solution comprises separating, or precipitating and separating, said solid metal A hydroxides from said solution.

6. The method of claim 5, wherein said solid metal A hydroxides are precipitated by an electrolysis process, a dialysis process, a hydrolysis process, osmosis, phoresis or a combination thereof.

7. The method of claim 6, wherein said hydrolysis process comprises adding water to said waste solution, thus causing precipitation of solid metal A hydroxides.

8. The method of claim 1, wherein said producing solid metal A hydroxides comprises the removal of dissolved hydroxide ions of metal A from said solution by decomposition of said dissolved hydroxide ions of metal A to solid metal A hydroxides and to free alkali hydroxides.

9. The method of claim 1, wherein, prior to said addition of metal B ions said waste solution undergoes re-digestion, wherein said re-digestion comprises heating and agitating said waste solution to re-dissolve metal A solid hydroxide precipitate.

10. The method of claim 1, wherein said metal B ion is selected from the group consisting of $Ca^{++}$, $Mg^{++}$, $Ba^{++}$ and $Sr^{++}$.

11. The method of claim 1, wherein said waste solution comprises NaOH, KOH, $NH_4OH$, LiOH or organic base hydroxides.

12. The method of claim 11, wherein the concentration of said KOH or NaOH solution varies between 20 and 45 wt %.

13. The method of claim 1, wherein said method further comprises filtration, centrifugation, solids cake compression, washing, decanting, dewatering, drying, solvent evaporation, or a combination thereof.

14. The method of claim 1, wherein said LDH comprises Al.

15. The method of claim 1, wherein said LDH comprises meixnerite, hydrotalcite (HTC), or a combination thereof.

\* \* \* \* \*